United States Patent
Sheppard et al.

(10) Patent No.: US 9,776,086 B2
(45) Date of Patent: *Oct. 3, 2017

(54) METHOD OF TRANSFORMING AN IMAGE FILE

(71) Applicant: TANGENTIX LIMITED, Sheffield, South Yorkshire (GB)

(72) Inventors: Paul Edmund Fleetwood Sheppard, Glasgow (GB); Timothy Alexander Ingham-Dempster, Keighley (GB); Michael Athanasopoulos, Sheffield (GB); Peter Jack Jeffery, Sheffield (GB); Hassan Ugail, Ilkley (GB); Gabriela Gonzalez Castro, Leeds (GB)

(73) Assignee: TANGENTIX LIMITED, Sheffield, South Yorkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,297

(22) Filed: Oct. 8, 2015

(65) Prior Publication Data
US 2016/0078640 A1    Mar. 17, 2016

Related U.S. Application Data

(63) Continuation of application No. 13/583,037, filed as application No. PCT/GB2011/050473 on Mar. 10, 2011, now Pat. No. 9,189,868.

(51) Int. Cl.
*G06F 15/16* (2006.01)
*A63F 13/355* (2014.01)
(Continued)

(52) U.S. Cl.
CPC ............ *A63F 13/355* (2014.09); *A63F 13/52* (2014.09); *G06T 9/001* (2013.01); *G06T 15/005* (2013.01);
(Continued)

(58) Field of Classification Search
CPC ....... G06T 9/001; G06T 15/005; G06T 17/20; G06T 2200/04
(Continued)

(56) References Cited

U.S. PATENT DOCUMENTS 5,956,431 A    9/1999 Iourcha et al.
6,384,821 B1   5/2002 Borrel et al.
(Continued)

FOREIGN PATENT DOCUMENTS

WO    WO 00/34921 A1    6/2000
WO    WO 2004/077833 A1  9/2004

OTHER PUBLICATIONS

International Search Report for PCT/GB2011/050473 dated Sep. 22, 2011.
(Continued)

*Primary Examiner* — Viet Vu
(74) *Attorney, Agent, or Firm* — Shumaker, Loop & Kendrick, LLP

(57) ABSTRACT

A computer-implemented method of transforming an image file by an image file transformation apparatus, the method including providing an image file in a pixel-based format having a plurality of pixels, dividing the pixels into a plurality of patches, sampling the pixels to generate boundary conditions relating to each of the patches, deriving Fourier coefficients of a solution to a partial differential equation according to the boundary conditions, and outputting the Fourier coefficients for each of the patches as a transformed image file.

17 Claims, 17 Drawing Sheets

(51) Int. Cl.

| | | |
|---|---|---|
| *A63F 13/52* | (2014.01) | |
| *G06T 9/00* | (2006.01) | |
| *H04N 7/173* | (2011.01) | |
| *H04N 21/2343* | (2011.01) | |
| *H04N 21/472* | (2011.01) | |
| *H04N 21/478* | (2011.01) | |
| *G06T 15/00* | (2011.01) | |
| *G06T 17/20* | (2006.01) | |

(52) U.S. Cl.
CPC ......... *G06T 17/20* (2013.01); *H04N 7/17336* (2013.01); *H04N 21/234318* (2013.01); *H04N 21/472* (2013.01); *H04N 21/4781* (2013.01); *H04N 21/47205* (2013.01); *A63F 2300/538* (2013.01); *G06T 2200/04* (2013.01)

(58) Field of Classification Search
USPC ........................................................ 709/247
See application file for complete search history.

(56) References Cited

U.S. PATENT DOCUMENTS

| 6,714,200 | B1 | 3/2004 | Talnykin et al. | |
|---|---|---|---|---|
| 6,961,055 | B2 | 11/2005 | Doak et al. | |
| 7,248,257 | B2 | 7/2007 | Elber | |
| 8,537,899 | B1* | 9/2013 | Taylor | H04N 19/122 375/240.2 |
| 2002/0109681 | A1 | 8/2002 | Elber | |
| 2004/0066977 | A1* | 4/2004 | Bickford | G01H 1/00 382/248 |
| 2004/0100465 | A1 | 5/2004 | Stowe et al. | |
| 2004/0135819 | A1* | 7/2004 | Maa | G06F 3/0481 715/840 |
| 2005/0104899 | A1 | 5/2005 | Swartz et al. | |
| 2006/0170676 | A1 | 8/2006 | Ugail | |
| 2006/0170688 | A1 | 8/2006 | Ugail | |
| 2006/0173659 | A1 | 8/2006 | Ugail | |
| 2008/0081701 | A1 | 4/2008 | Shuster | |
| 2008/0247464 | A1 | 10/2008 | Seregin et al. | |
| 2008/0288222 | A1* | 11/2008 | Ugail | G06T 17/10 703/2 |

OTHER PUBLICATIONS

Ugail H et al: "Towards a Definition of Virtual Objects Using Partial Differential Equations", Cyberworlds, 2009. CW '09. International Conference on, IEEE, Piscataway, NJ, USA, Sep. 7, 2009, pp. 138-145, XP031542119, ISBN: 978-1-4244-4864-7, the whole document,.

Li, F. and Lau, R. and Kilts, D.: "GameOD: An Internet Based Game-on-Demand Framework", VRST '04 Proceedings of the ACM Symposium on Virtual Reality Software and Technology, Nov. 10, 2004-Nov. 12, 2004, pp. 129-136, XP000002658451, Hong Kong, DOI: 10. 1145/107534.1077559, abstract, pp. 129-131, p. 133, section 5.2.

Ugail H et al: "Partial Differential Equations for Function Based Geometry Modelling within Visual Cyberworlds", Cyberworlds, 2008 International Conference on, IEEE, Piscataway, NJ, USA, Sep. 22 2008, pp. 224-231, XP031442113, ISBN: 978-0-7695-3381-0, the whole document.

Schmalstieg D et al: "Demand-Driven Geometry Transmission for Distributed Virtual Environments", Computer Graphics Forum, Wiley-Balckwell Publishing Ltd, GB, vol. 15, No. 3, Aug. 26, 1996, pp. C421-C432, XP009025629, ISSN: 0167-7055, DOI: 10.1111/1467-8659. 1530421, the whole document.

Li, W. B. et al: "Collaborative Distributed Virtual Sculpting", Proceedings IEEE 2001 Virtual Reality. (VR). Yokohama, Japan, Mar. 13, 20010101, Los Alamitos, CA, IEEE Comp. Soc, US, Jan. 1, 2001, pp. 217-224, XP031172769, DOI: 10.1109/VR.2001. 913789, ISBN: 978-0-7695-0948-8, the whole document.

Preda M. et al.: "Collada+MPEG-4 or X3D+MPEG-4", IEEE Vehicular Technology Magazine, IEEE, US, vol. 5, No. 1, Mar. 1, 2010, pp. 39-47, XP011304736, ISSN: 1556-6072, the whole document.

Bloor M.I.G. et al.: "Generating Blend Surfaces Using Partial Differential Equations", Computer Aided Design, Elsevier Publishers BV., Barking, GB, vol. 21, No. 3, Apr. 1, 1989, pp. 165-171, XP000035347, ISSN: 0010-4485, DOI: 10.1016/0010-4485 (89) 90071-7, the whole document.

* cited by examiner

METHOD OF TRANSFORMING AN IMAGE FILE

CROSS-REFERENCE TO RELATED APPLICATIONS

This Continuation application claims priority from U.S. application Ser. No. 13/583,037 filed Oct. 12, 2012, issued Nov. 17, 2015 as U.S. Pat. No. 9,189,868, which is a 35 U.S.C. §371 National Stage filing of PCT/GB2011/050473 filed Mar. 10, 2011 claiming priority from GB1003962.6 filed Mar. 10, 2010, the entire contents of each of which are incorporated by reference herein.

BACKGROUND

Technical Field

The present invention relates generally to the field of systems for delivering multimedia content, and more particularly, but not exclusively, to a method and apparatus for delivering graphical information across a network.

Description of Related Art

It is desired to deliver rich and entertaining multimedia content to users across a network such as the Internet. However, there are technical restrictions concerning the transmission of data, such as bandwidth and delay. Also, there are difficulties regarding capabilities of the hardware devices that supply and receive the multimedia content, such as the need for specialised graphics hardware (e.g. a dedicated graphics processing unit (GPU)) and limitations on delivering content to multiple users simultaneously from the same source hardware.

As one example, US2005/104,889 of Clemie et al. shows that it is well known to deliver multimedia content from a server device to a client device over a network. Most often, a stream of audio and video (AV) data is provided, known as video-streaming. The client device can begin playback of initial portions of the AV data, e.g. to begin playing a video clip or movie, while still receiving other portions of the AV data to be played later. This AV data typically includes two-dimensional moving image data (2D video data), and many encoding and compression schemes have been developed in recent years, such as MPEG, to reduce the bandwidth required to carry such AV data and improve delivery of the content.

As well as delivering pre-made movies or other content that can be prepared in advance, it is also now desired to deliver games and games programs to be actively played on a client device. However, games generally are more technically challenging, because the game should respond to actions and commands by the user and each game session is usually unique to that user. As one option, a game is delivered on a physical carrier such as a CD or DVD optical disc, which the user must purchase and physically transport to a client device such as a games console. The purchased game can then be supplemented with additional content, such as additional characters, levels or missions. The additional content can be delivered across a network, either as a download package or by streaming. Another option, again as discussed in US2005/104,889, is to deliver game code (application code) to a client device across a network. Delivering the whole game takes a long time, but has proved to be a relatively acceptable approach in commercial systems. The game code can be streamed, so that game play can begin while later sections of a game are still being downloaded. In each case, the application code runs on the client device and the graphical data is rendered at the client device, which means that the client device must be relatively powerful and resourceful, like a PC or games console. Yet another option is to provide a centralised game server running the game code, while delivering a relatively lightweight stream of AV data to the client device (i.e. a video stream) which allows a greater range of client devices to participate in the delivery of rich multimedia content. Games and games programs generally still place intensive demands on the underlying hardware and network infrastructure. Even gaming based on video streaming places significant workload on the central server, and this workload increases yet further when serving tens or thousands of individual client devices. Hence, it is still desired to explore and develop other approaches to gaming.

It is known to deliver 3D graphical objects across a network. Generally, these 3D graphical elements represent an object as a geometric structure (such as a polygonal wire-frame geometry or mesh) with an overlying surface (texture). The 3D object data is then reconstructed by a renderer at the client device, to produce video images for a display screen. the video images are then typically output in combination with a coordinated audio stream. As one example, FAMC coding (Frame-based Animated Mesh Compression), has been proposed in the context of MPEG-4, to try to reduce bandwidth consumption for animated 3D graphical elements.

It is now desired to provide a multimedia content delivery system which addresses these, or other, limitations of the current art, as will be appreciated from the discussion and description herein.

SUMMARY OF THE INVENTION

According to the present invention there is provided an apparatus and method as set forth in the appended claims. Other features of the invention will be apparent from the dependent claims, and the description which follows.

In one aspect, a server apparatus is provided that comprises an environment engine to provide a virtual environment comprising a plurality of objects. A handler unit receives user commands from a client device. These user commands are passed to the environment engine, and the virtual environment changes and adapts in response to the received user commands. The objects are provided in a compressed format and are transmitted across a network to the client device. The client device decompresses and renders the objects to output a sequence of visual images representing the virtual environment.

In one aspect, the server executes the environment engine but avoids complex graphics handling, which reduces workload at the server while retaining a high degree of control and flexibility relating to the environment engine. Meanwhile, the compressed object data reduces traffic across the network to improve bandwidth consumption. Rendering the objects at the client device involves local hardware to minimise latency while delivering rich and engaging multimedia content.

In another aspect there is provided an object transformation apparatus that transforms and compresses object data to provide compressed object data. In another aspect there is provided an object transformation apparatus that transforms compressed object data to recreate object data relating to an original object.

In another aspect there is provided a client device that receives compressed object data from a server apparatus, decompresses the received compressed object data into decompressed object data relating to a plurality of objects within a virtual environment, renders the decompressed object data and outputs a sequence of image frames for display on a visual display device associated with the client device, wherein the client device receives user inputs in relation to the displayed image frames and sends user commands to the server apparatus in return.

In another aspect there is provided a multimedia content delivery system comprising the server apparatus and the client device coupled together by a network.

In one aspect there is provided a multimedia content delivery server apparatus comprising an environment engine that controls a virtual environment responsive to user commands, wherein the virtual environment includes a plurality of objects; an object transformation unit that transforms original object data relating to the plurality of objects into compressed object data; a data management unit that transmits the compressed object data to the client device so that the compressed object data is decompressed and rendered by the client device to output the virtual environment on a visual display device associated with the client device; and a server-side I/O handler unit that receives the user commands in return from the client device and provides the user commands to the environment engine.

In one aspect the environment engine is arranged to perform control processing of the virtual environment including controlling actions of the objects and interactions between the objects in response to the user commands, while graphical processing is performed locally on the client device to display the virtual environment on the visual display device.

In one aspect the environment engine controls the plurality of objects in the virtual environment responsive to the user commands including controlling actions of the objects and interactions between the objects in response to the user commands. The user commands may include movement commands and/or action commands that affect the plurality of objects in the virtual environment.

In one aspect, the environment engine is maintained on the server to be modified or updated at the server. In one aspect, the environment engine is not delivered to the client device.

In one aspect, multiple instances of the environment engine are provided to control a plurality of the virtual environments simultaneously, wherein each virtual environment is associated to a respective one of a plurality of the client devices.

In one aspect, the object transformation unit transforms object geometry data into compressed object geometry data comprising coefficients of a solution to a partial differential equation. The coefficients are suitably coefficients of a Fourier series. The coefficients may have a plurality of modes. The modes may be Fourier modes.

In one aspect, the environment engine controls the client device to represent the virtual environment including objects regenerated from the coefficients. In one aspect, the environment engine controls the client device to regenerate the objects from the coefficients at a plurality of predetermined resolution levels. The resolutions levels may be varied according to graphical processing capabilities of the device, graphical display properties of the visual display unit and/or according to priority levels which define a relative importance level of the objects within the virtual environment.

In one aspect, the object data comprises object geometry data in a polygon mesh format. The object transformation unit may produce compressed object geometry data comprising the coefficients. In one aspect, the object transformation unit comprises: an analyser unit arranged to provide a base mesh relating to an original object, wherein the base mesh comprises a plurality of patches each based on a polygon; a processor unit arranged to provide boundary conditions relating to each of the patches and to provide coefficients of a solution to a partial differential equation according to the boundary conditions; and an output unit arranged to output compressed object geometry data comprising the coefficients provided by the processor.

In one aspect, the object data comprises object image data in a pixel-based format. The object transformation unit may produce compressed object image data comprising the coefficients. In one aspect, the object transformation unit comprises: an input unit arranged to receive an image file in a pixel-based format having a plurality of pixels; an image processor arranged to divide the pixels into a plurality of patches, sample the pixels to generate boundary conditions relating to each of the patches, and derive coefficients of a solution to a partial differential equation according to the boundary conditions; and an output unit arranged to output the coefficients for each of the patches as a transformed object image file.

In one aspect, the coefficients may form a mode zero and one or more subsequent modes. At least the mode zero may be separated from the other subsequent modes and delivered to the client device through a first delivery channel. The other modes may be delivered to the client device through another, second delivery channel. The first delivery channel may have enhanced security compared with the second delivery channel.

In one aspect, the data management module is arranged to determine how many of the modes are to be provided to the client device. That is, the number of modes may be selected as a variable number of modes up to a maximum number of available modes. In one aspect, the number of modes to be provided to the client device is selected according to a connection status of the network with the client device. The number of modes may be selected according to an incoming bandwidth available at the client device. The number of modes may be selected according to a graphics capability or processing capability of the client device. The number of the modes to be provided to the client device may be selected according to priority levels assigned to the plurality of objects.

In one aspect, the object transformation unit operates to provide an object library of the compressed object data relating to the plurality of objects, and the data management unit selectively transmits the compressed object data from the object library to the client device as ordered by the environment engine to evolve the virtual environment in response to the received user commands.

In one aspect, the data management unit is arranged to provide an initial set of the compressed object data sufficient for the client device to begin representing the virtual environment, followed by one or more subsequent sets of the compressed object data dynamically while the client device represents the virtual environment on the visual display device.

In one aspect, a content delivery server is arranged to supply portions of game data, including the compressed object data, to the client device, in response to control instructions from the data management unit.

In one aspect, the virtual environment is a game environment.

In one aspect there is provided a client device comprising: a client-side I/O handler unit arranged to receive compressed object data; a regeneration unit arranged to transform the compressed object data into decompressed object data relating to a plurality of objects within a virtual environment; and a graphics processor or renderer arranged to render the decompressed object data and output for display on a visual display device associated with the client device. The handler unit is further arranged to receive user inputs at the client device in relation to the displayed output and send user commands across a network in return.

In one aspect, the compressed object data comprises coefficients of a solution to a partial differential equation, and the regeneration unit is arranged to regenerate the plurality of objects from the coefficients using the partial differential equation.

In one aspect, the regeneration unit is arranged to regenerate the plurality of objects with geometry in a polygon mesh format from the coefficients and/or to regenerate images, or textures, in a pixel-based format from the coefficients. In one aspect, the regeneration unit is arranged to regenerate the objects from the coefficients at a plurality of predetermined resolution levels with varying target quantities of vertices/faces, or pixels, respectively.

In one aspect, the client device further comprises a data management unit arranged to reunite at least mode zero of the coefficients with the other subsequent modes. At least mode zero may be delivered to the client device through a first delivery channel while other subsequent modes are delivered through a second delivery channel.

In one aspect, the data management unit is arranged to determine a number of the modes to be provided to the client device. The number of modes may be determined according to a connection status of the network with the client device, according to graphical processing capabilities of the device, and/or according to priority levels assigned to the plurality of objects.

In one aspect, the client device is arranged to receive an initial set of the compressed object data sufficient to begin representing the virtual environment, followed by one or more subsequent sets of the compressed object data dynamically while the client device represents the virtual environment on the visual display device.

In one aspect, the client device comprises a client object cache of the compressed object data relating to the plurality of objects, and a client data management unit that selectively requests further of the compressed object data from the server to add to the client object cache.

In one aspect there is provided a method for delivering graphical information across a network from a server apparatus to a client device, comprising: transforming original object data relating to a plurality of objects into compressed object data; controlling a virtual environment responsive to user commands, wherein the virtual environment includes the plurality of objects; delivering the compressed object data over the network to the client device to be rendered by the client device to output the virtual environment on a visual display device; and receiving the user commands from the client device in return and providing the user commands to the environment engine.

In one aspect there is provided a method of transforming objects by: providing geometry data relating to an original object; analysing the geometry data relating to the original object to provide a base mesh, wherein the base mesh comprises a plurality of patches each based on a polygon from the base mesh; processing each of the patches to provide boundary conditions relating to each of the patches; deriving coefficients of a solution to a partial differential equation according to the boundary conditions; and outputting the coefficients for each of the patches as transformed object geometry data.

In one aspect the analysing step includes reducing the original object into a lower resolution version to form the base mesh. In one aspect the processing step includes mapping each of the patches to the geometry data of the original object. In one aspect the mapping step comprises defining a plurality of control points relative to each of the patches, and moving the control points toward the geometry data of the original object. In one aspect, in the processing step, the boundary conditions are curves and the curves are based on the control points. In one aspect the method further includes the step of storing additional positional information relevant to each of the patches including one or more position points which set a position of the patches and/or which provides continuity between adjacent ones of the patches.

In one aspect there is provided an object regeneration method, which is suitably performed at a client device, which includes regenerating the objects by: receiving geometry data relating to an object to be regenerated, wherein the geometry data comprises coefficients relating to each of a plurality of patches; subdividing each of the patches to generate a plurality of polygons by using the coefficients as a solution to a partial differential equation; and outputting the plurality of polygons as geometry data of the regenerated object.

In one aspect the subdividing step comprises iteratively subdividing the patches through a plurality of subdivision levels, wherein each level produces progressively greater numbers of the polygons. In one aspect the method further includes setting a position of each of the patches based on additional positional information in the geometry data, wherein the additional positional information relevant to each of the patches includes one or more position points which set a position of the patches and/or which provides continuity between adjacent ones of the patches.

In one aspect there is provided an object transformation apparatus, comprising: an analyser arranged to provide a base mesh from geometry data relating to an original object, wherein the base mesh comprises a plurality of patches each based on a polygon derived from the base mesh; a processor arranged to provide boundary conditions relating to each of the patches and to provide coefficients of a solution to an equation according to the boundary conditions; and an output unit arranged to output transformed object data comprising the coefficients provided by the processor.

In one aspect there is provided an object regeneration apparatus, comprising: an input unit arranged to receive geometry data relating to an object to be regenerated, wherein the geometry data comprises coefficients as a solution to a partial differential equation for each of a plurality of surface patches; a transformation processor unit arranged to solve the partial differential equation using the coefficients to recreate each of the surface patches as a volumetric representation comprising a plurality of polygons; and an output unit arranged to output the plurality of polygons of the regenerated object.

In one aspect there is provided a method of transforming objects by providing an image file in a pixel-based format having pixels; dividing the pixels into a plurality of patches; sampling the pixels to generate boundary conditions relating to each of the patches; deriving coefficients of a solution to a partial differential equation according to the boundary conditions; and outputting the coefficients for each of the patches as a transformed image file.

In one aspect the pixels of the image file relate to a plurality of channels, and the dividing step comprises forming the pixel patches on a pixel array separately for each of the channels. In one aspect the method comprises overlying a plurality of boundary selectors onto the pixels, sampling the pixels to provide a plurality of sample points, and forming the boundary conditions as boundary curves based on the sample points. In one aspect the method comprises manipulating the sample points to create the boundary conditions as closed form curves. In one aspect the method comprises quantising the coefficients. In one aspect the method comprises encoding the coefficients. In one aspect the method comprises providing a plurality of offsets between the image file and a regenerated version of the image file in the pixel-based format produced from the coefficients.

In one aspect there is provided a method of regenerating an image file by: receiving data relating to an image file to be regenerated, wherein the data comprises coefficients relating to each of a plurality of patches; generating a plurality of pixel values by using the coefficients as a solution to a partial differential equation for each of the patches; and outputting the plurality of pixel values as a regenerated image file in a pixel-based format.

In one aspect, the patches relate to a plurality of channels, and the pixel values are generated for each of the channels from the patches.

In one aspect there is provided an image file transformation apparatus, comprising: an input unit arranged to receive an image file in a pixel-based format having pixels; an image processor arranged to divide the pixels into a plurality of patches, sample the pixels to generate boundary conditions relating to each of the patches, and derive coefficients of a solution to a partial differential equation according to the boundary conditions; and an output unit arranged to output the coefficients for each of the patches as a transformed image file.

In one aspect there is provided an image file regeneration apparatus, comprising: an input unit arranged to receive data relating to an image file to be regenerated, wherein the data comprises coefficients relating to each of a plurality of patches; a processor arranged to generate a plurality of pixel values by using the coefficients as a solution to a partial differential equation for each of the patches; and an output unit arranged to output the plurality of pixel values as a regenerated image file in a pixel-based format.

In one aspect there is provided a tangible non-transient computer readable medium having recorded thereon instructions which when executed by a computer cause the computer to perform the steps of any of the methods defined herein.

BRIEF DESCRIPTION OF THE DRAWINGS

For a better understanding of the invention, and to show how example embodiments may be carried into effect, reference will now be made to the accompanying drawings in which:

FIGS. 13a-13f, is a schematic diagram illustrating an example image processing mechanism;

FIGS. 14a-14c, is a schematic diagram illustrating a further aspect of the example image processing mechanism;

DETAILED DESCRIPTION OF THE EXAMPLE EMBODIMENTS

The example embodiments will be discussed particularly with reference to a gaming system, for ease of explanation and to give a detailed understanding of one particular area of interest. However, it will be appreciated that other specific implementations will also benefit from the principles and teachings herein. For example, the example embodiments can also be applied in relation to tools for entertainment, education, engineering, architectural design and emergency planning. Other examples include systems providing visualisations of the human or animal body for teaching, training or medical assistance. There are many specific environments which will benefit from delivering rich and involving multimedia content.

Figure 1:
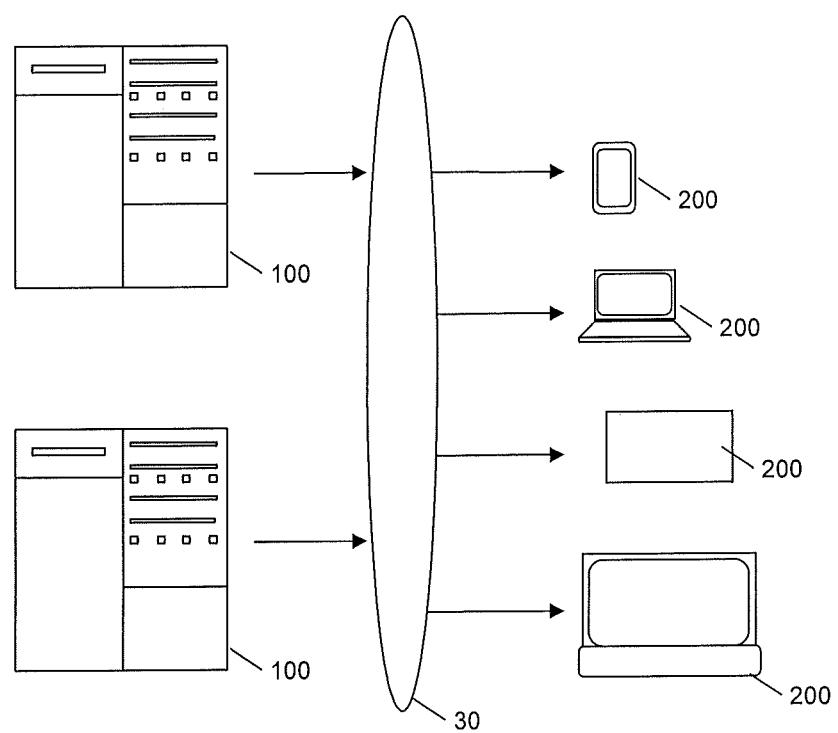
FIG. 1 is a schematic diagram of an example multimedia content delivery system for delivering graphical information across a network.

FIG. 1 is a schematic diagram of a multimedia content delivery system for delivering graphical information across a network. This graphical information may include 2D data, 3D data, or a combination of both 2D and 3D data. Generally, 2D data is defined relative to a plane (e.g. by orthogonal x & y coordinates) while 3D data is defined relative to a volume (e.g. using x, y and z coordinates). The example content delivery system includes at least one server device 100 and at least one client device 200 which are coupled together by a network 30. The underlying software and hardware components of the server device 100, the client device 200 and the network 30 may take any suitable form as will be familiar to those skilled in the art. Typically, the server devices 100 are relatively powerful computers with high-capacity processors, memory, storage, etc. The client devices 200 may take a variety of forms, including handheld cellular phones, PDAs and gaming devices (e.g. Sony PSP™, Nintendo DS™, etc.), games consoles (XBOX™, Wii™, PlayStation™), set-top boxes for televisions, or general purpose computers in various formats (tablet, notebook, laptop, desktop). These diverse client platforms all provide local storage, memory and processing power, to a greater or lesser degree, and contain or are associated with a form of visual display unit such as a display screen or other visual display device (e.g. video goggles or holographic projector). The network 30 is suitably a wide area network (WAN). The network 30 may include by wired and/or wireless connections. The network 30 may include peer to peer networks, the Internet, cable or satellite TV broadcast networks, or cellular mobile communications networks, amongst others.

Graphical Information Delivery

In one example embodiment, the server 100 and the client device 200 are arranged to deliver graphical information across the network 30. In the following example, the graphical information is assumed to flow substantially unidirectionally from the server 100 to the client 200, which is generally termed a download path. In other specific implementations, the graphical information is transmitted from the client 200 to be received by the server 100, which is generally termed an upload path. In another example, the graphical information is exchanged bidirectionally.

A key consideration is that the bandwidth across the network 30 may be limited or otherwise restricted. There are many limitations which affect the available bandwidth for communication between the sever 100 and the client device 200 on a permanent or temporary basis, as will be well known to those skilled in the art, such as the nature of the network topography (wireless vs. wired networks) and the transmission technology employed (CDMA vs. EDGE), interference, congestion and other factors (e.g. rapid movement of mobile devices, transition between cells, etc). Therefore, as will be discussed in more detail below, the example embodiments allow effective use and management of available bandwidth even when transmitting highly detailed graphical information. Further, it is desired to manage the bandwidth to minimise or reduce latency or delay. Security is another important consideration. In particular, it is desired to inhibit unauthorised copying of the graphical information. Therefore, as will be discussed in more detail below, the example embodiments provide effective security for transmitting sensitive graphical information across a network.

Example System Architecture

Figure 2:
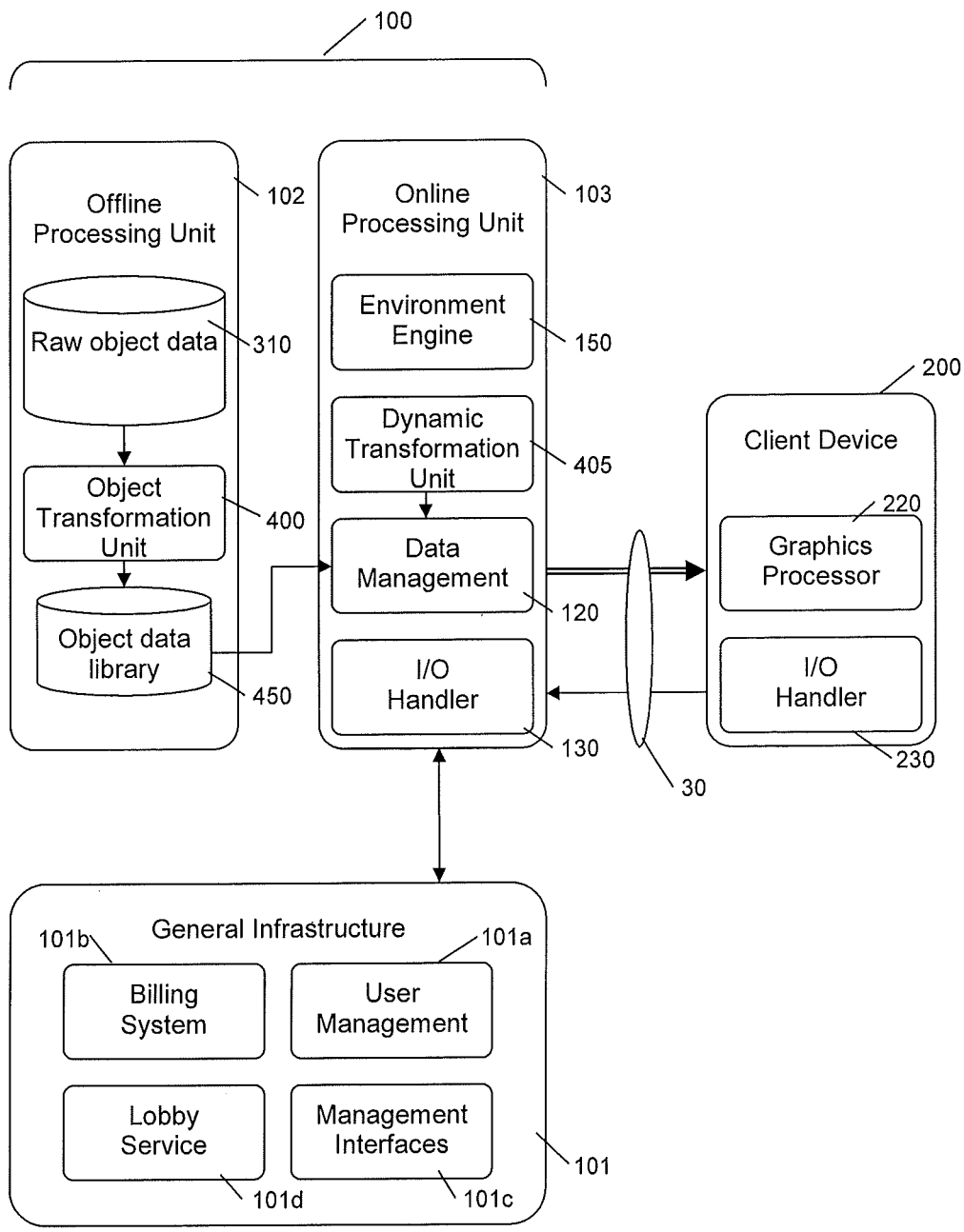
FIG. 2 is a schematic diagram showing the example multimedia content delivery system in more detail.

FIG. 2 is a schematic diagram showing an example multimedia content delivery system in more detail.

In this example embodiment, the server 100 and/or the client device 200 executes application code to control a virtual environment that will be represented visually through the client device 200. Suitably, the server 100 receives data requests from at least one of the client devices 200, and the server 100 delivers relevant game data in real time to the client 200, which enables the client device 200 to output the visual representation on a display screen. These data requests and the response data will depend upon the implementation of the system, which is discussed later in various embodiments.

In the example general system architecture illustrated in FIG. 2, the server 100 may include a general infrastructure unit 101, an offline processing unit 102, and an online processing unit 103. Optionally, these units may be distributed amongst several server devices arranged at physically separate locations or sites. Also, these units may be duplicated or sub-divided according to the needs of a particular practical implementation.

The general infrastructure unit 101 provides support infrastructure to manage the content delivery process. For example, the general infrastructure unit 101 provides modules 101a-101d that manage user accounts including authentication and/or authorisation functions 101a, billing 101b, developer management interfaces 101c, and lobby services 101d that allow users to move around the system to access the available games or other multimedia content.

The example offline processing unit 102 may include an object transformation unit 400 that transforms complex 3D objects into a compressed format, as will be discussed in more detail below. The object transformation unit 400 suitably receives raw object data 310 and converts or transforms the object data into a transformed format as will be discussed below.

The object transformation unit 400 suitably operates statically, in advance, so that an object library 450 of objects becomes available in the transformed format. As one option, a games developer may supply 3D objects in a native high-resolution format such as a detailed polygon mesh. These objects represent, for example, characters or components of the game such as humans, animals, creatures, weapons, tables, chairs, stairs, rocks, pathways, etc. The object transformation unit 400 then transforms the received objects into the compressed format and provides the library 450 of objects to be used later. This, in itself, is a useful and beneficial component of the system and may have a variety of uses and applications.

The example online processing unit 103 interacts with the client devices 200 over the network 30 to provide rich and engaging multimedia content to the user. In the example embodiment, the system operates in real time so that user commands directly affect the multimedia content which is delivered onscreen to the user.

In one example, a game code runs on the server 100 with input commands from the client 200, and the server 100 then delivers the relevant graphics data in real-time to the client 200 for rendering and display by the client device 200. In another example, the game code runs on the client 200 which generates data requests to the server 100, and the server 100 then delivers the relevant graphics data to the client 200 for rendering and display by the client device 200.

Optionally, the online processing unit 103 includes a dynamic transformation unit 405, which may perform the object transformation function dynamically, e.g. while other data is being delivered to the client device 100. In the example gaming system, this architecture allows new compressed object data to be created even while the game is being played. These dynamically transformed objects are suitably added to the object library 450.

The online processing unit 103 suitably includes a data management module 120 and a server-side I/O handler 130. In the example gaming system, the data management module 120 handles the dispatch of game data to the client 200. As an example, the data management module 120 includes a bandwidth management component to ensure that the bandwidth available to serve the client 200 across the network 30 is not exceeded.

In the example embodiment, the client 200 includes, amongst other components, a graphics processor 230 and a client-side I/O handler 230. Here, the graphics processor 220 takes the 3D graphical data, received such as from the server 200 or elsewhere, and performs relatively intensive graphical processing to render a sequence of visual image frames capable of being displayed on a visual output device coupled to the client 200. These frames may be 2D image frames, or 3D image frames, depending on the nature of the visual output device. The client-side I/O handler 230 connects with the server-side I/O handler 130 as discussed above.

Remote Virtual Environment

In the example embodiment, the server 200 further comprises an environment engine 150 which is arranged to control a remote virtual environment. In this case, the environment engine 150 is located remote from the client device 200. Suitably, this environment is to be populated with 3D objects taken from the object library 450 and/or generated dynamically while the user navigates within the environment. In this example embodiment, the server 100 and the client device 200 cooperate together dynamically during operation of, e.g., a game, to control and display the virtual environment through the client device 200.

Advantageously, the server 100 applies powerful compression to key graphical elements of the data, and the workload required to deliver the visual representation is divided and shared between the server 100 and the client 200. In particular, this workload division allows many hundreds or even many thousands of the client devices 200 to be connected simultaneously to the same server 100.

In this example embodiment, the workload is divided by sending, or otherwise delivering, compressed data associated with the graphics for processing and rendering in real time on the client 200, so that graphically-intensive processing is performed locally on the client device 200, while control processing of the virtual environment (such as artificial intelligence or "AI") is performed on the server 100. The control processing suitably includes controlling actions and interactions between the objects in response to the user commands (e.g. a car object crashes into a wall, or one player character object hits another player character or a non-player character).

In the example gaming system, user commands generated within the client device 200 may take the form of movement commands (e.g. walk, run, dive, duck) and/or action commands (e.g. fire, cover, attack, defend, accelerate, brake) that affect the operation of the objects in the virtual environment. Suitably, these user commands are fed back to the server 100 to immediately update the game content being delivered onscreen at the client device 200. To this end, the server 100 includes the Input/Output (I/O) handler unit 130 to handle this return stream of user inputs sent from a corresponding client I/O handler unit 230 in the client device 200. This return stream of user input data may be delivered in any suitable form, depending upon the nature of the client device 200.

In an illustrative example, the environment engine 150 functions as a game engine. Here, the games engine 150 sits on the remote server 100 and deals with internal aspects of the game that do not require output to the client 200. When output to the client 200 is required, such as a graphics display or audio, then information or commands are sent to the client 200 for processing at the client 200. For example, the server 100 commands the client device 200 to retrieve and display a particular object at a particular position. In the example embodiments, the games engine 150 deals with the underlying artificial intelligence relevant to the game and determines how the output will change based on the inputs from the client 200. When output to the client is required, the games engine 150 makes a call to the games data management service 120 to handle the delivery of the data to the client 200. A new object may now be delivered to the client device 200, ideally using the compressed data format as discussed herein. Alternatively, the server 100 may deliver a reference to an object that has previously been delivered to the client device 200 or otherwise provided at the client device 200. Further, the server 100 may deliver commands or instructions which inform the client device 200 how to display the objects in the virtual environment.

Advantageously, in this example embodiment the server 100 now has minimal need for processing graphics, which is instead performed on the client 200. Hence, the server 100 is able to be implemented using available standard server hardware for running the system. This is a key drawback of other approaches such as video streaming, which need investment in higher cost specialist server hardware for rendering the graphics and transforming it into the video stream.

The server 100 is also better able to service multiple clients 200 simultaneously. As one option, the server 100 virtualizes instances of the game engine 150, in order to maximize the number of instances of a game running on the physical server hardware. Off-the-shelf virtualization technologies are currently available to perform this task, but need adapting to the specifics of real-time games delivery. By contrast, the video streaming approach will often need to allocate the resources of a full server system to each user, because efficient graphics virtualization technology does not yet exist. Here, the example system virtualizes the game code on the server 100, whilst running the graphics on the client 200.

The system does not require a significant data download before the user can start playing their game. The game engine 150 is located on the remote server 100 and hence does not need to be transmitted or downloaded to the client 200. Also, the game engine 150 can be modified or updated on the server 100 relatively quickly and easily, because the game engine 150 is still under close control of the game service provider. By contrast, it is relatively difficult to update or modify a game engine that has already been distributed in many thousands of copies (e.g. on optical disks or as downloads to a local storage device) onto a large number of widely dispersed client devices (e.g. game consoles). Hence, this split processing between the server 100 and the client 200 has many advantages.

Client-Side Data Handling

Figure 3:
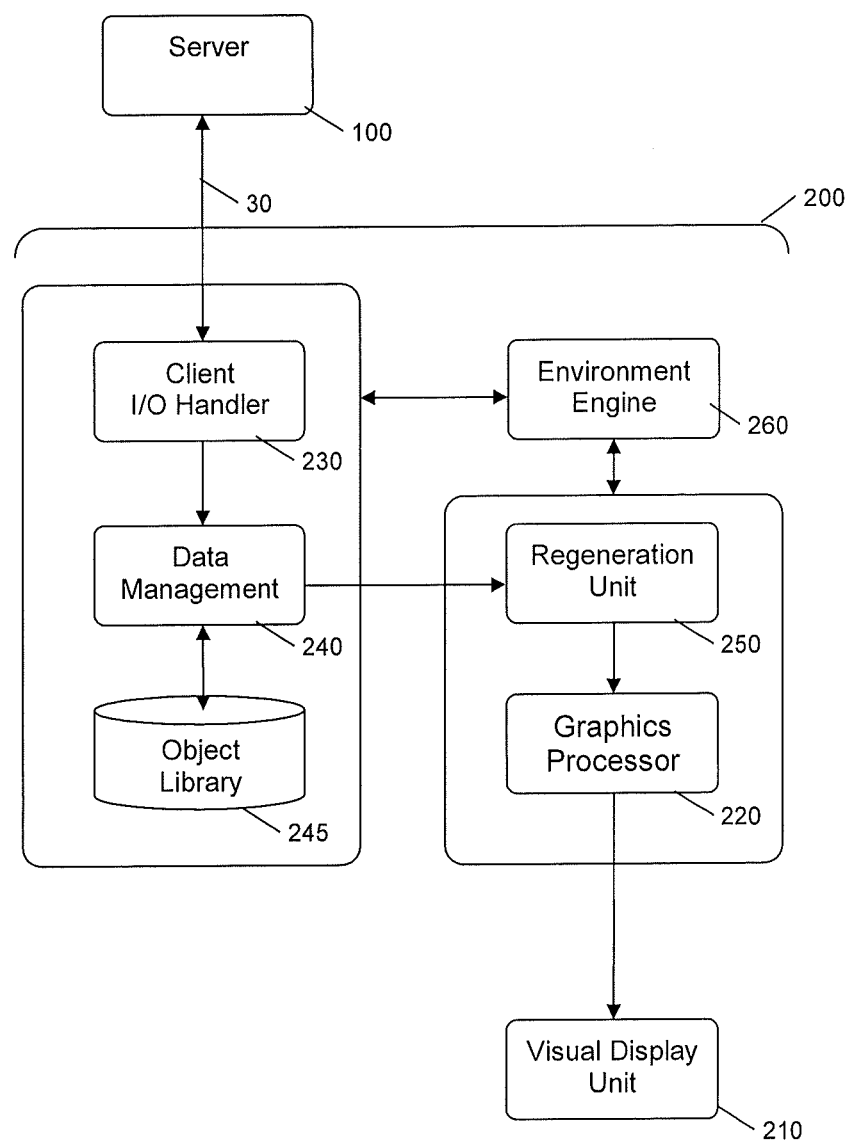
FIG. 3 is a schematic view showing an example client device.

FIG. 3 is a schematic diagram showing the example client device 200 in more detail.

As discussed above, the client device 200 suitably includes at least a graphics processor unit 220 and an I/O handler 230. The I/O handler unit 230 handles network traffic to and from the server 100, including requesting data from the server 100 as required by the client device 200. The received data suitably includes compressed object data as described herein, which is passed to a data management unit 240 to be stored in a local storage device, e.g. in a relatively permanent local object library and/or a temporary cache 245. Suitably, the stored objects are retrieved from the cache or library 245 when needed, i.e. when these objects will appear in a frame or scene that is to be rendered at the client device 200. Conveniently, in some embodiment, the objects may be delivered to the client device in advance and are then released or activated by the server device to be used by the client device.

In this example embodiment, the client device 200 further comprises an object regeneration unit 250. The regeneration unit 250 is arranged to recreate, or regenerate, a representation of the object in a desired format. The recreated data may be added to the object library 245 to be used again later. A renderer within the graphics processor unit 220 then renders this recreated representation to provide image frames that are output to the visual display unit 210 within or associated with the client device 200. Suitably, the recreated data is a polygon mesh, or a texture, or an image file.

In this example embodiment, the client device 200 optionally further comprises a client-side environment engine 260. Suitably, this environment engine 260 controls the graphical environment in response to inputs from a user of the client device. That is, in a gaming system, the environment engine may be implemented by application code executing locally on the client device to provide a game that is displayed to the user via the display device 210. In another example embodiment, some parts of the game are handled locally by the client-side environment engine 260 while other parts of the game are handled remotely by the server-side environment engine 150 discussed above.

Typically, a game will include many segments of video which are played back at appropriate times during gameplay. In the example embodiments, these video sequences are dealt with locally using any suitable video-handling technique as will be familiar to the skilled person. These video sequences in games typically do not allow significant player interaction. Also, a game will typically include many audio segments, including background music and effects. In the example embodiments, the audio segments are dealt with locally using any suitable audio-handling technique as will be familiar to the skilled person.

In the example embodiments, the user of the client device 200 is able to begin playing a game relatively quickly. In particular, the example embodiments allow the object data to be downloaded to the client device including a minimum initial dataset sufficient for gameplay to begin. Then, further object data is downloaded to the client device 200 from the server 100 to allow the game to progress further. For example, in a car racing game, an initial dataset provides objects for a player's car and scenery in an immediate surrounding area. As the player or players explore the displayed environment, further object data is provided at the client device 200.

Object Transformation—Overview

Figure 4:
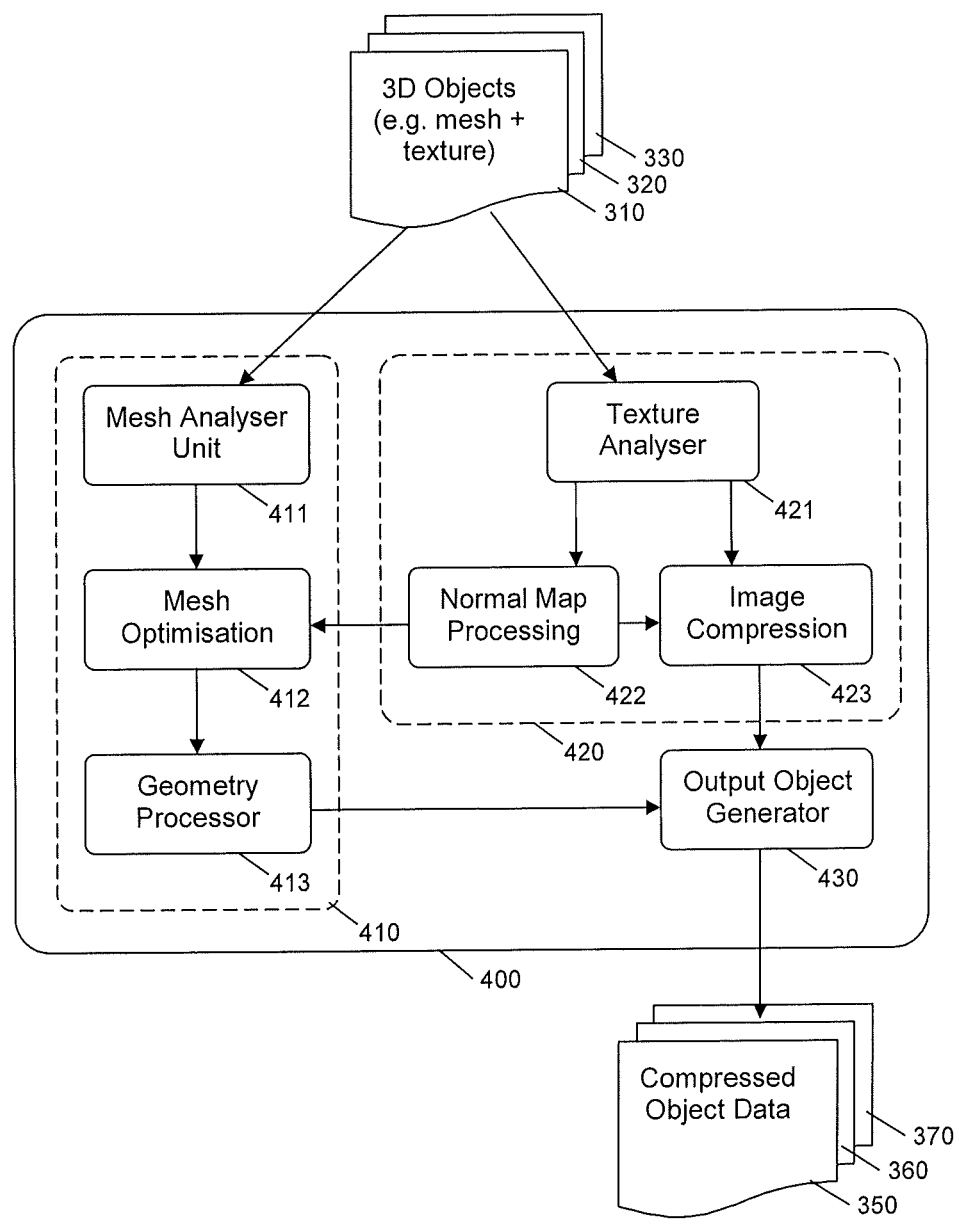
FIG. 4 is a schematic view showing an example object transformation unit.

FIG. 4 is a schematic view showing an example embodiment of the object transformation unit 400 in more detail. In this example, object data 310 is provided comprising a set of volumetric geometry data 320 and/or a set of texture data 330. The object transformation unit 400 transforms the received raw object data 310 to provide transformed and/or compressed object data 350. That is, the object transformation unit 400 may suitably provide compressed object geometry data 360 and/or compressed object image data 370. The compressed object geometry data 360 and/or compressed object image data 370 may comprise coefficients of a solution to a partial differential equation.

As shown in FIG. 4, the object transformation unit 400 suitably comprises a geometry transformation unit 410, a texture transformation unit 420, and an output object generator 430. The geometry transformation unit 410 is arranged to transform the received geometry data 320, i.e. a polygon mesh data representing the shape (volume) of the object. Meanwhile, the texture transformation unit 420 is arranged to transform the received texture data 320, i.e. the texture data relating to the surface appearance of the object. The output object generator 430 is arranged to coordinate the geometry data and the texture data to provide the compressed object data 350.

In this example embodiment, the object transformation unit 400 is arranged to perform both a geometry compression function and a texture compression function. However, in other example embodiments the object transformation unit 400 is arranged to perform at least one of these functions independently of the other. That is, the object transformation unit 400 may perform solely a texture compression function which compresses data relating to a surface texture of a volumetric object. Also, the object transformation unit 400 may perform solely a volumetric geometry compression function which compresses data relating to a 3D shape or volume of the object.

In FIG. 4, the geometry transformation unit 410 suitably includes a mesh analyser 411, a mesh optimisation unit 412, and a geometry processor 413. The texture transformation unit 420 suitably includes a texture analyser 421, a normal map processing unit 422 and an image compression unit 423. These units perform the geometry transformation function and/or the texture transformation function.

Geometry Transformation

It is widely known to use polygon representations of 3D objects. Typically, the 3D object is represented in 3D space based on a geometric object, like a mesh or wire frame, which may be formed of polygons. Conveniently, these polygons are simple polygons such as triangles. There are many well-known specific implementations of polygon representations as will be familiar to those skilled in the art, and high-speed, high-performance dedicated hardware for handling polygon mesh representations is well known and widely available, such as in graphics cards, GPUs, and other components. However, polygon representations have a number of disadvantages. For example, polygon representations are relatively large, especially when finely detailed object geometry is desired, with each object taking several Mb of storage. Hence, polygon representations are difficult to store or transmit efficiently.

Transforming the 3D object provides a mechanism for efficiently storing and transmitting an object which was originally represented by a high resolution mesh. Also, the object can be restored and reproduced at any of a plurality of resolutions. Optionally, the object is recreated at or even above its original resolution. At the same time, the mechanism reduces the size of the information required to reproduce the model in different environments.

The example object transformation apparatus and method are particularly suitable for providing a compact representation of original 3D data given as polygonal geometry. The apparatus and method are applicable in many specific environments, such as computer games and virtual environments in general. Also, the example embodiments are useful for 3D data transfer over networks with limited bandwidth and/or real time geometry representation in computing platforms (e.g. mobile phones). These and other advantages of the example mesh transformation apparatus and method will be appreciated by the skilled person from the description herein.

The example embodiments, as described herein, use simplified data representing only feature lines of a given object while encoding finer details of the geometry through a series of coefficients. Suitably, these coefficients are related to a solution of a partial differential equation. The result is an analytic function which describes the geometry at arbitrary level of resolution with minimal storage. This new representation occupies 1/10th or less of the space of the original version.

Advantageously, the example embodiments represent complex geometry at arbitrary levels of resolution in terms of mathematical functions by taking simplified low resolution geometry as input and encoding the high level information of the geometry within a solution of a partial differential equation. The example embodiments represent complex geometry in terms of small number of well behaved analytic functions able to store the data describing complex geometry efficiently. Furthermore, the representation of such geometry involves computing functions whereby real time display of complex 3D objects on a computer screen is possible.

In the example embodiments, any given high resolution geometry mesh model is compressed into a set of surfaces representing the solution to a Partial Differential Equation (PDE). These are known in the art as PDE surfaces.

The example embodiment describes any given high resolution geometry mesh model as a set of surfaces representing the solution to a Partial Differential Equation (PDE). These are known in the art as PDE surfaces. Further background information concerning PDE surface patches is provided, for example, in US2006/170676, US2006/173659, US2006/170688 (all by Hassan UGAIL). Transforming the 3D object provides a mechanism through which an object which is originally represented by a high resolution mesh can be stored or transmitted efficiently, and then reproduced at one or more desired resolution levels. At the same time, the mechanism reduces the size of the information required to reproduce the model in different environments, where the object is recreated at or even above its original resolution.

This example uses PDE surfaces arising from the solution to a partial differential equation, and suitably an elliptic partial differential equation. As one option, the biharmonic equation in two dimensions is used to represent each of the region into which the original model is divided. The biharmonic equation leads to a boundary value problem, which is uniquely solved when four boundary conditions are specified. Analytic solutions to the biharmonic equation can be found when the set of boundary conditions are periodic, leading to a Fourier series type solution. Therefore, a set of four boundary conditions is provided for each of the regions composing the object, then this set is processed and the analytic representation of the region is found. Given that the same type of equation is used to represent each of the regions composing the object, the full object is characterized by a set of coefficients, which are associated with the analytic solution of the equation in use. The equation is solved in two dimensions, such as u and v, which are regarded as parametric coordinates. These coordinates are then mapped into the physical space (3D volume).

The regions into which the object is divided are given as polygons, which are suitably regular polygons such as triangles. These polygons represent a highly reduced version of the original geometry. In one example, the contour of a triangle is used as the outermost boundary curve and thus three additional curves are extracted from the original geometry in order to complete the set of four boundary conditions. Key features of the original mesh model are preserved during the curve extraction procedure, so that such features are retrieved when required at higher subdivision levels. After extracting the curves, the coefficients characterizing each of the surfaces are computed and stored so that they can be used in an independent framework (provided that such an independent framework has the means to retrieve the surface appropriately).

Multiple resolution levels are achieved by taking advantage of the parametric nature of the coordinates u and v. These coordinates are generally discretised when computing a given surface patch and, therefore, the resolution is changed by varying the number of points into which the coordinates u and v are discretised. Thus, the resolution at which the entire object is retrieved can be changed by either increasing or decreasing the resolution of either one or both of the parametric coordinates. For example, the resolution is increased when the object is prominent in a field of view (e.g. close to the viewer) and is decreased when the object is less significant (e.g. far from the view), amongst other parameters. Furthermore, the resolution at which the object is retrieved can be optimized by changing the resolution of the parametric coordinates for each surface patch individually according to different criteria. Additionally, a subdivision scheme can be provided so that the distribution of points increases at the boundary of each surface patch, e.g. to improve continuity between patches.

The example mechanism provides efficient representation of high resolution mesh models. The model can be represented by a set of coefficients responsible for characterizing the full geometry, offering two major advantages. The first is reducing the size of the information associated with the mesh model and the second is providing the means for obtaining representations of the same mesh model at different resolution levels. Thus, this mechanism offers a more exploitable and efficient technique to generate mesh models.

Figure 5:
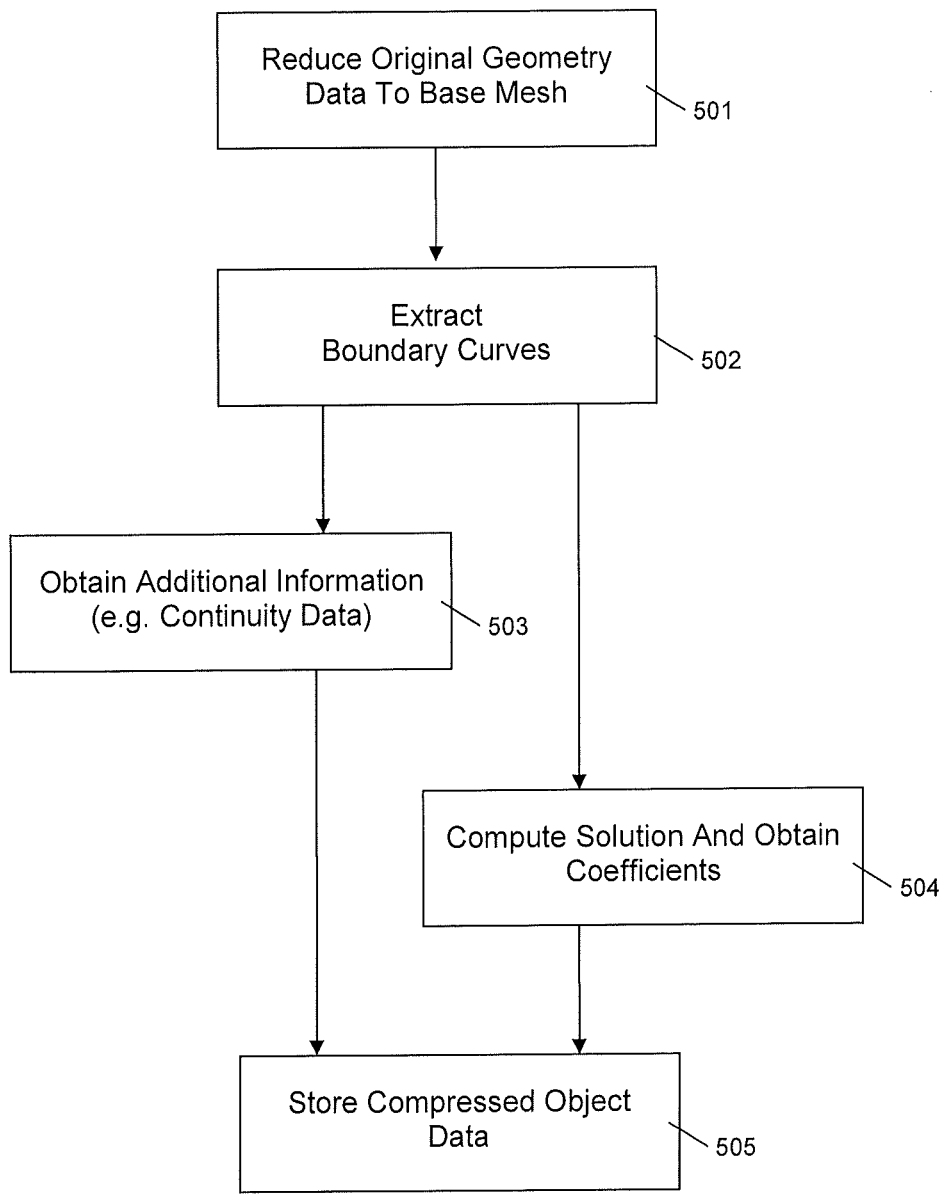
FIG. 5 is a schematic flowchart of an example object transformation method.

FIG. 5 is a flowchart showing an example method of object transformation. Here, the example transformation method of the object mesh involves the following steps:

Step 501—Reduce the original model into a suitable low-resolution mesh configuration, which conveniently uses regular polygons such as triangles. Suitably, reducing the mesh takes into account a number of elements such are curvature, boundary information, co-planar faces, etc.

Step 502—Extract a corresponding set of curves associated with each of the regular polygons (triangles) forming the low resolution mesh obtained in the previous step. These curves are extracted from the high resolution mesh by firstly finding the curve corresponding to the triangle delimiting the surface patch by find the closest point in the high resolution mesh to each of the vertices of the triangle. Then this curve is enriched by finding additional points of the triangle in the same fashion. The second and third curves correspond to a set of points in the high resolution mesh describing inner triangles. The fourth and last curve may consists of the mesh point closest to the centroid of each respective triangle.

Step 503—Store additional information such as the position of the boundary points separately so that continuity at the boundaries can be guaranteed. The normals associated with the previous set of point together with the face normals and texture coordinates of the low-poly configuration are also stored separately. Typically, the original 3D object data will also include normals and texture co-ordinates which are used to skin the mesh. In the example embodiment, the normals and texture coordinates are also computed and are stored separately as part of this additional information. As one option, the normals are calculated using linear interpolation (or polynomial interpolation e.g. Bezier curves, Lagrange polynomials or even general spline curves) between a set of normals associated with points at the boundary of each surface patch. As one example, texture coordinates are computed using barycentric coordinates along the triangle defined by the reduced geometry.

Step 504—Compute the solution to the biharmonic equation for all the triangular surface patches. The coefficients associated with the analytic solution of such are found and stored in a file.

Step 505—The information obtained at step 504 is then added to the additional information obtained at step 503. Now, with all the stored information, the object can be reproduced at any given subdivision level.

In the example embodiment, algorithms are provided including a function computing the subdivision level at which each triangular patch would be subdivided for any general subdivision level according to different criteria, a subdivision scheme based on the parametric coordinates u and v, a function calculating the solution to the biharmonic equation in combination with a function capable of guaranteeing continuity and the boundary, a function calculating the normals for each point, and a procedure responsible for calculating texture coordinates at each point.

Figure 6:
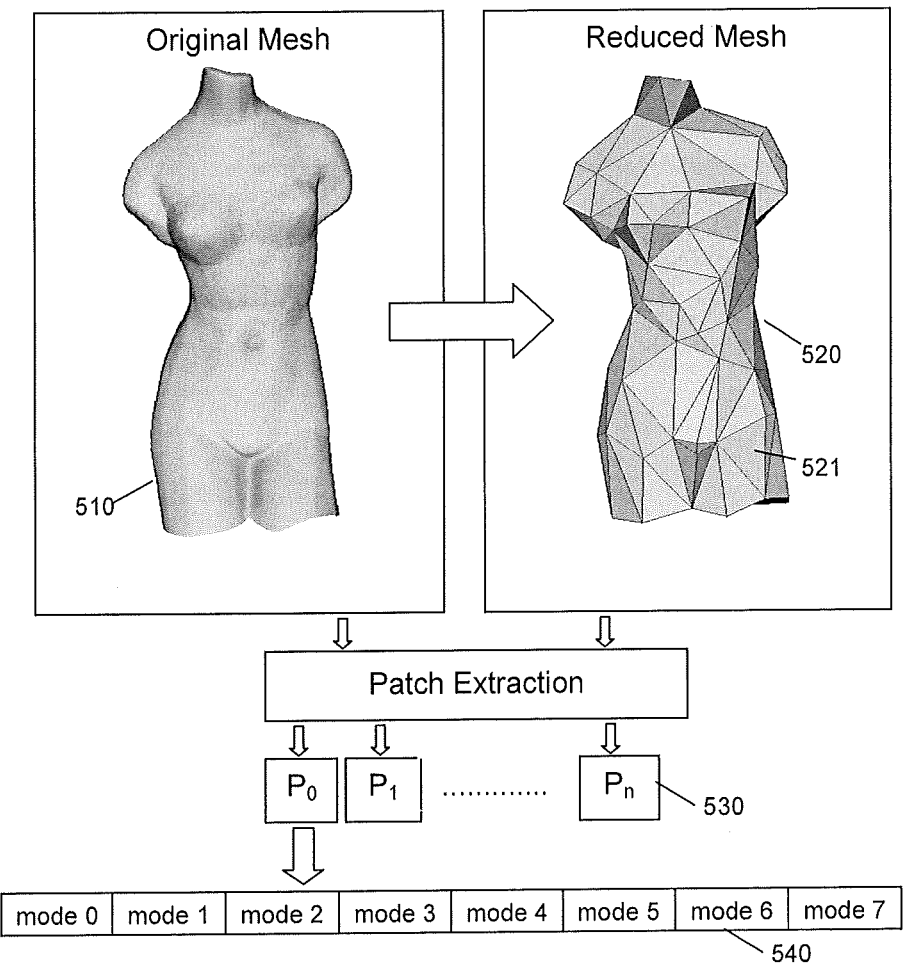
FIG. 6 is a schematic diagram illustrating an example geometry conversion process.

FIG. 6 is a schematic diagram to further illustrate the geometry transformation process. In particular, FIG. 6 shows an original high-resolution mesh model 510 and a low-resolution simplified version of the same mesh model 520 which will form a base mesh. The simplified model 520 is suitably produced from the high-resolution model 510 by a process of mesh simplification. These two models 510, 520 are then used together in order to produce a plurality of PDE surface patches 530. In the example embodiment, each of the PDE surface patches 530 is conveniently represented by a set of Fourier coefficients 540. The coefficients 540 can be divided into a plurality of modes, and in this case modes 0-8 are illustrated. As will be discussed later, these coefficients are very convenient for storing and transmitting the geometry of the object.

The example embodiments provide a mechanism for automatically extracting and representing a given mesh 510 to a set of boundary curves that can be used to compute a PDE surface patch 530. This process receives the original polygon mesh representation 510 of an object and produces a plurality of PDE surface patches 530 each represented as set of the coefficients 540.

Mesh Simplification

Automatic extraction of PDE surface patches 530 from a given mesh model 510 is relatively difficult. In a first step, the example embodiment is arranged to analyze and decompose the original surface 510 in a geometrical way. In the case of mesh segmentation, the model 510 is segmented into a number of regions that are uniformly divided according to some property, such as curvature, geodesic distance etc. However, in the case of shape segmentation, the mesh model 510 is divided into parts that correspond to main features of the given shape, e.g. legs, arms, head, and torso for a human body mesh model.

There are many approaches available in the art that cover both mesh segmentation and shape segmentation techniques. However, these known solutions are usually based on solving an application-specific problem and hence are tailored to a particular environment. Picking the most appropriate segmentation algorithm is then dependent on the application requirements. For example, mesh based approaches usually require that the boundaries of the regions must be smooth; and the boundaries where the regions meet should allow continuity with the neighbouring regions. However, the mesh simplification algorithm employed in the example embodiments is able to divide the shape into uniform curve-sets that will be used to calculate parametric PDE surface patches 530, instead of mesh patches.

The example segmentation technique may divide the given mesh model 510 to a set of uniform shaped and distributed patches based on the mesh curvature. In the example embodiments, a first step is to identify contour regions containing important features that are desired to be extracted. However, the technique for obtaining such results ideally should be able to process any given model no matter its complexity. This is usually the most difficult part for most mesh segmentation techniques and there several approaches in the art to obtain this information, such as region growth, clustering, or explicit boundary extraction. The example embodiments use these and/or other available mesh reduction techniques to simplify the original mesh model 510 to form the simplified model 520, and then use the simplified model 520 as a guideline for extracting a set of templates (candidate patches) that will be used later to obtain feature points from the original high resolution input mesh 510.

In the example embodiments, the mesh simplification reduces the number of faces within the simplified mesh model 520, while keeping the overall shape and boundaries of the original model 510 preserved as much as possible. As an example, the high-resolution model 510 may have some 10,000 faces (polygons), while the simplified model 520 may be reduced by one or more orders of magnitude, e.g. to around 1,000 faces or even 100 faces. As a more specific example, in FIG. 6 the original Venus model 510 contains 11,043 vertices and 21,955 faces. After mesh simplification the mesh model 520 is reduced to 106 vertices and 198 faces. However, if the reduced mesh 520 contains faces with small areas and/or faces with long edges, it may produce errors during the curve extraction process. Therefore, the distribution of points and faces across the low resolution mesh 520 produced during the mesh simplification process may be considered in order to achieve satisfactory results. Complicated mesh models that contain a lot of curvature, manifold geometry or sharp edges may benefit from less reduction in order to keep key feature points in the reduced version.

Mesh simplification techniques can be grouped into local and global strategies. Local simplification strategies are usually greedy, in that they simplify the mesh by repeating a process based on some local operator, whereas global strategies are applied to the input mesh as a whole. A typical local simplification approach usually consists of an operation that when applied to the mesh, it processes small collections of elements (faces, vertices) to produce the new simplified mesh. As will be familiar to those skilled in the art, suitable techniques for mesh simplification include vertex decimation, edge contraction, or Quadric Error Metrics based on Garland and Heckbert.

Boundary Curve Extraction

Figure 7:
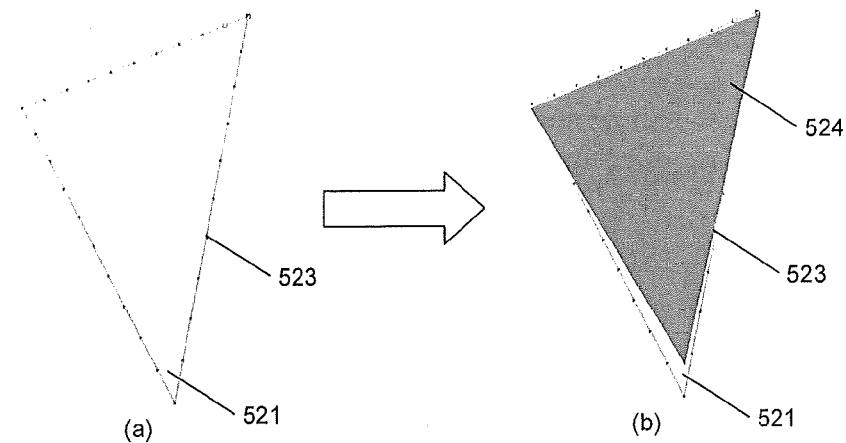
FIG. 7 is a schematic diagram further illustrating the geometry conversion process.

FIG. 7 is a schematic diagram further illustrating the geometry transformation process. FIG. 7a shows one polygonal face 521 of the low-resolution model 520, which will be used here as the candidate patch. FIG. 7b shows a template or outer boundary curve 524 that is obtained by projecting a plurality of control points 523 around the low-resolution face 521 onto the high-resolution model 510.

In this example of FIG. 7, the extracted PDE surface patches 530 are represented as a set of template boundary curves 524 connected to each other using low resolution face connectivity. In this example, each face 521 of the simplified model 520 will be converted into a first degree polynomial curve 524 containing thirty-one control points 523. Suitably, the number of control points 523 is uniform for all the curve-set representing the mesh geometry. This uniform distribution of the control points between patches is helpful when computing the PDE method for a particular subdivision level.

Conveniently, the low resolution model 520 is used as a means for identifying significant contour features of the original mesh 510. These features are contained in the low resolution mesh 520 where the mesh simplification algorithm will respect them as constraints during the reduction process. The next step consists of converting the faces 521 of the low resolution model 520 into the set of curves 524 that can be used to calculate the PDE.

In the example embodiments, each face 521 of the reduced model 520 is associated with a corresponding region of the high resolution model 510. This ensures that all regions of the original mesh 510 will be included in the final model representation. In one example, the control points 523 in the original mesh 510 are compared to find the closest point for each vertex of the given low resolution face 521. As one option, the three corner points in each triangular low-resolution face 521 are snapped to the closest point of the original mesh 510. Each edge of the low-resolution face 521 is then divided into a plurality of points 523, such as by linear interpolation. In the example embodiment there are ten control points along each edge, and a further control point is used to so that the plurality of control points 523 form a closed triangular curve or tri-curve.

These control points 523 are modified and projected onto the original high-resolution mesh 510, such as by ray-tracing. Suitably, each control point 523 is projected in turn to search respective faces of the original mesh 510 until a ray-to-triangle hit has been found. This process can take a lot of processing time for an entire mesh. To that end, the example embodiments use a sub mesh partitioning technique to extract a mesh region that lies within the template boundary curve 524. A geometric primitive such as a box, triangle or circle is provided to cover the surface region of the model 510. A point to primitive intersection test is then computed in order to find which point of the original mesh 510 is inside that region.

Figure 8:
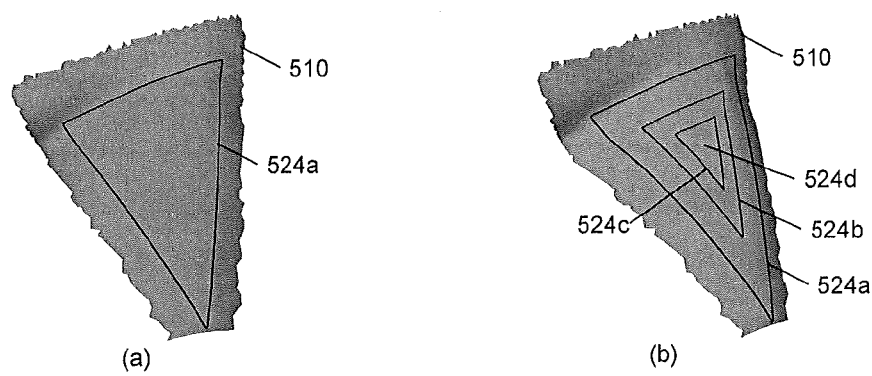
FIG. 8 is a schematic diagram further illustrating the geometry conversion process.

FIG. 8 is a schematic diagram further illustrating the geometry transformation process.

As shown in FIG. 8, the new template boundary curve 524a now represents the outline of the respective region of the original mesh 510, where each control point 523 has been mapped to the high resolution model 510. The operation now continues with the generation of three more boundary curves 524b, 524c & 524d that cover the inner areas of the region defined by the template boundary curve 524. Suitably, each of the inner boundary curves 525 is created by scaling the outer template boundary curve 524. Optionally each of the new inner curves 524 likewise comprises a plurality of the control points 523. These control points 523 are likewise suitably projected to the surface of the original model 510 such as by using the same ray-tracing procedure. In one example, the innermost boundary curve 524d contains only one point, which is the centroid of the outer boundary curve 524a projected to the surface. The innermost boundary curve 524d is used to close the surface. By repeating this process for each of the faces 521 of the low resolution model 520, every region of the original model 510 is mapped to four boundary curves 524a-d each with control points projected to the surface of the original model 510.

Figure 9:
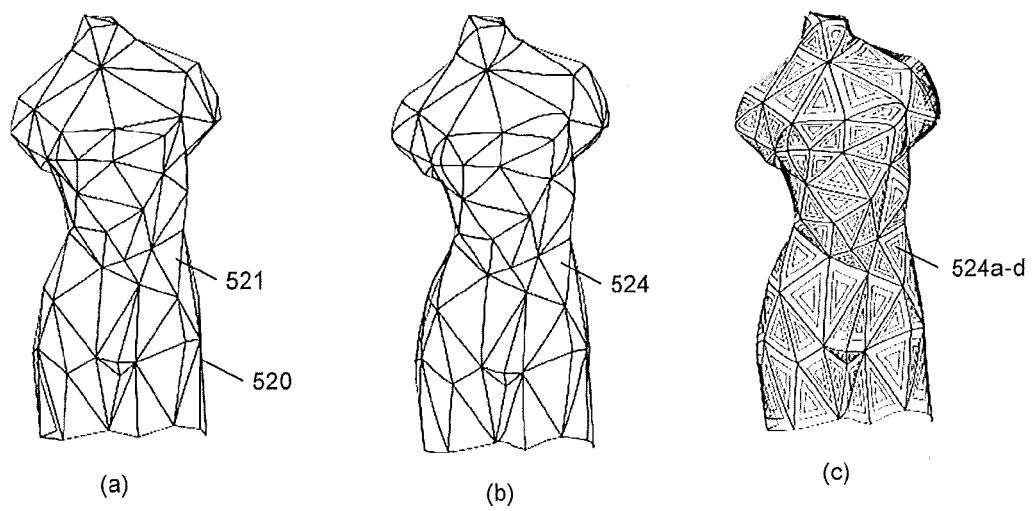
FIG. 9 illustrates an example Venus model created using the geometry conversion process described herein.

FIG. 9 illustrates a Venus example model using the geometry conversion process described herein.

FIG. 9a shows the template or outer boundary curves 524 that represent the front side of the Venus model. The curves 524 have been extracted from the reduced version of the original Venus model 510, wherein each template boundary curve 524 at this stage is a flat triangular curve comprising thirty-one of the control points 523. As noted above in total there are one hundred and ninety eight of the PDE patches 530, each mapped from a respective face 521 obtained from the low resolution reduced model 520.

FIG. 9b shows the PDE patches 530 with just the outer boundary curves 524a after the feature extraction process. Each boundary curve 524a has been projected to the surface of the original model surface using the raytracing techniques discussed herein.

FIG. 9c shows the PDE patches 530 now also containing the inner curves 524b-d. The set of boundary curves 524a-d in each PDE patch 530 are used as the boundary conditions required for computing the PDE surface patch.

As is known in the art, traditionally a PDE surface patch represents the surface of an object by in effect transforming from measurements in X, Y, Z directions to instead represent the surface in a parametric region defined by two parameters u and v such that any point on the surface X is given by an expression of the form:

$$\underline{X}(u,v)=(x(u,v),y(u,v),z(u,v)) \quad (1)$$

The shape of the surface is then defined in relation to the u,v space. In more detail, a PDE surface is a parametric surface patch $\underline{X}(u,v)$, defined as a function of two parameters u and v on a finite domain $\Omega \subset R^2$, (where $R^2$ is the standard two-dimensional Euclidean space) by specifying boundary data around the edge region $\partial \Omega$ of $\Omega$. Typically the boundary data are specified in the form of $\underline{X}(u,v)$ and a number of its derivatives on $\partial \Omega$. Moreover, this approach regards the coordinates of the (u,v) point as a mapping from that point in $\Omega$ to a point in the physical space. To satisfy these requirements the surface $\underline{X}(u,v)$ is regarded as a solution of a PDE based on the form of elliptic bi-harmonic equation $\nabla^4=0$, namely $$\left(\frac{\partial^2}{\partial u^2} + a^2 \frac{\partial^2}{\partial v^2}\right)^2 \underline{X}(u, v) = 0. \quad (2)$$

Here the boundary conditions on the function $\underline{X}(u,v)$ and its normal derivatives $\partial \underline{X}/\partial n$ are imposed at the edges of the surface patch. Equation (2) is a fourth-order equation. In other embodiments, sixth or even higher order PDEs may be employed. However, for ease of illustration, the bi-harmonic form of PDE is discussed herein.

There exist many methods to determine the solution of Equation (2) ranging from analytic solution techniques to sophisticated numerical methods. Here, a closed form analytic solution of Equation (2) can be utilised.

Choosing the parametric region to be $0 \leq u \leq 1$ and $0 \leq v \leq 2\pi$, the periodic boundary conditions can be expressed as $\underline{X}(0,v)=\underline{P}_1(v)$, $\underline{X}(1,v)=\underline{P}_2(v)$, $\underline{X}_u(0,v)=\underline{d}_1(v)$, and $\underline{X}_u(1,v)=\underline{d}_2(v)$.

The boundary conditions $\underline{P}_1(v)$ and $\underline{P}_2(v)$ define the edges of the surface patch at u=0 and u=1 respectively. Using the method of separation of variables, the analytic solution of Equation (2) can be written as:

$$\underline{X}(u, v) = \underline{A}_0(u) + \sum_{n=1}^{\infty} [\underline{A}_n(u)\cos(nv) + \underline{B}_n(u)\sin(nv)], \quad (3)$$

where $$A_0(u) = \underline{a}_{00} + \underline{a}_{01}u + \underline{a}_{02}u^2 + \underline{a}_{03}u^3, \quad (4)$$

$$\underline{A}_n(u) = \underline{a}_{n1}e^{anu} + \underline{a}_{n2}ue^{anu} + \underline{a}_{n3}e^{-anu} + \underline{a}_{n4}ue^{-anu}, \quad (5)$$

$$\underline{B}_n(u) = \underline{b}_{n1}e^{anu} + \underline{b}_{n2}ue^{anu} + \underline{b}_{n3}e^{-anu} + \underline{b}_{n4}ue^{-anu} \quad (6)$$

where $\underline{a}_{00}$, $\underline{a}_{01}$, $\underline{a}_{02}$, $\underline{a}_{03}$, $\underline{a}_{n1}$, $\underline{a}_{n2}$, $\underline{a}_{n3}$, $\underline{a}_{n4}$, $\underline{b}_{n1}$, $\underline{b}_{n2}$, $\underline{b}_{n3}$ and $\underline{b}_{n4}$ are vector constants, whose values are determined by the imposed boundary conditions at u=0 and u=1.

For a general set of boundary conditions, in order to define the various constants in the solution, it is appropriate to Fourier analyse the boundary conditions and identify the various Fourier coefficients. The solution will then be the infinite series given Equation (3).

The preferred technique for finding an approximation to $\underline{X}(u,v)$ is based on the sum of the first few Fourier modes, i.e., $$\underline{X}(u, v) \approx \underline{A}_0(u) + \sum_{n=1}^{N} [\underline{A}_n(u)\cos(nv) + \underline{B}_n(u)\sin(nv)], \quad (7)$$

where N is a relatively small integer (e.g. N<10 or N<13). Thus, this process arrives at the Fourier coefficients (PDE coefficients) 540 for each PDE surface patch 530.

Geometry Regeneration

Figure 10:
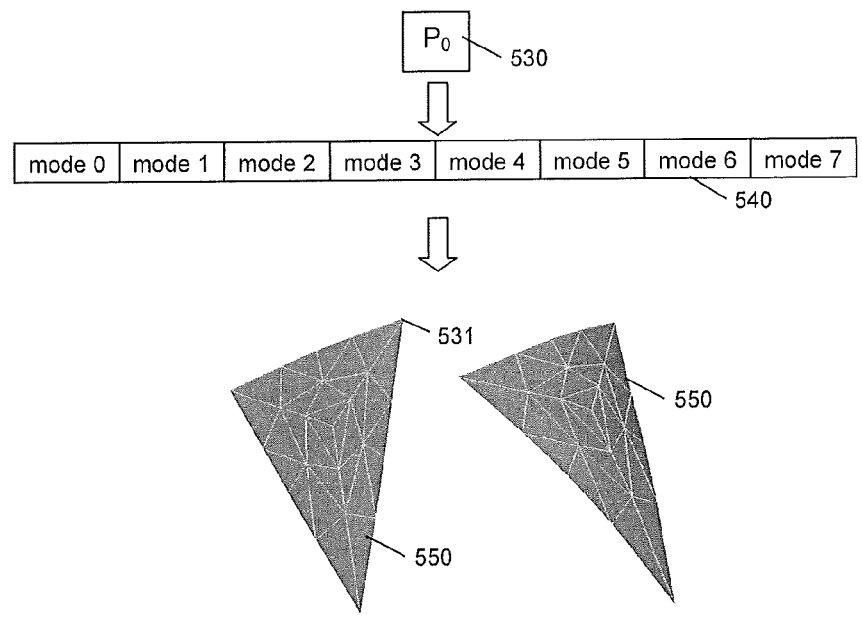
FIG. 10 illustrates a process of regenerating a mesh model from PDE surface patches.

FIG. 10 illustrates a process of regenerating a mesh model 550 from the PDE surface patches 530 and their respective coefficients 540.

Generally, the client device 200 as described above is provided with the coefficients 540 relating to each of a plurality of PDE surface patches 530 which together will define the geometry of this particular object. In the example embodiments, each of the PDE surface patches is anchored in the volumetric (x,y,z) space, such as by providing the coordinates for position points 531 at the three corners of this triangular PDE surface patch. More conveniently, it is desired to join adjacent patches with good edge connectivity. Therefore, in this example, one or more position points 531 along each edge may be defined and provided to the client device 200. The coordinates of these additional position points 531 are suitably stored and transmitted alongside the coefficients 540.

Given the coefficients 540 and, optionally, the control points 531, the polygonal mesh 550 is now recreated from the PDE surface patch by solving the PDE for a variety of values of u and v, thus generating specific points (vertices) and connections of the polygonal mesh 550. Any suitable subdivision scheme may be employed to progressively subdivide this region into polygons until a desired resolution is achieved. In general terms, each level of subdivision produces ever-larger numbers of ever-smaller polygons. For example, u=1, v=0, 2π/3, 4π/3 provides the three corner points the triangle (three vertices, one face) at subdivision level 0. Subdivision level 1 may add u=0, v=0 which suitably defines the centroid of this triangular region (so now four vertices, three faces). Subdivision level 2 may add u=0.5, v=0, 2π/3, 4π/3 and u=1, v=π/3, π, 5π/3 (ten vertices, 12 faces). Selecting further u,v parameter values provides further vertices and faces. In one example, subdivision level 10 achieves 3070 vertices which give 4204 faces.

FIG. 10 shows two views of one region of the regenerated polygonal surface 550 which has been recreated using the PDE method. Conveniently, the example embodiments are able to regenerate a polygonal mesh representation of the surface analytically, and therefore offer the advantages of parametric surfaces. In particular, the analytic solution is able to dynamically adjust the resolution of the regenerated polygonal surface. In this example, the polygonal surface has been generated at subdivision level 3. The surface can be re-computed from subdivision level 0 to theoretically any given number. Usually most of the details of the surface are reproduced at levels 4 to 5. Generally, higher numbers of subdivisions add only relatively minor extra points and faces. However, a number of factors may affect the desired subdivision levels, such as the relative size of the region covered by this PDE surface patch and the relative resolution of the original model against the recreated model.

Figure 11:
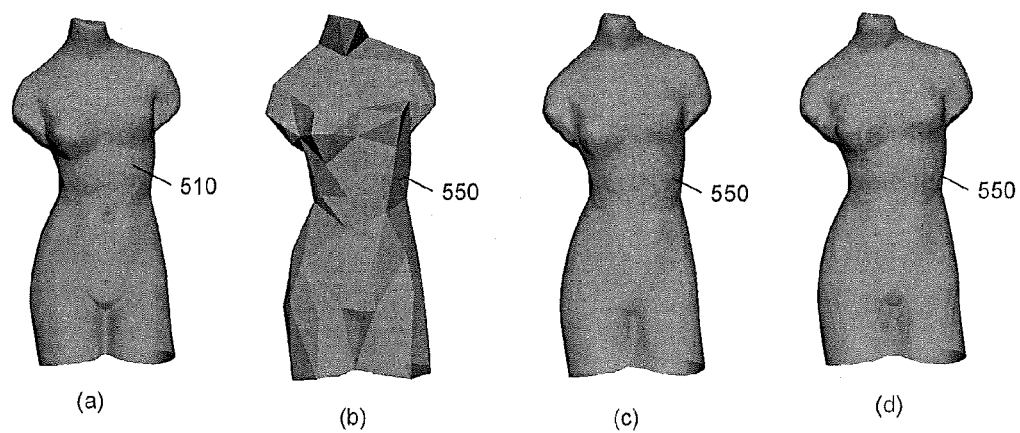
FIG. 11 shows an example regenerated mesh model of Venus obtained in different subdivision levels.

FIG. 11 shows an example regenerated mesh model of Venus obtained in different subdivision levels.

FIG. 11a shows the original Venus mesh model, for comparison. FIGS. 11b, c & d show the new PDE surface consisting of 198 patches for different subdivision levels. Table 1 below shows total number of vertices and faces for comparison. In FIG. 11b, subdivision level 0 comprises the three points that form the triangle patch, where the regenerated model has the same as the low resolution model 520. FIG. 11c shows the PDE model at subdivision level 2 and at this level most of the features of the original model have been obtained. FIG. 11d shows the PDE surface in subdivision level 4, comprising 4,356 vertices and 5,940 faces.

TABLE 1

Total number of elements compared to original Venus model

| Model | Elements | Original | Sub 0 | Sub 2 | Sub 4 |
|-------|----------|----------|-------|-------|-------|
| Venus | Vertices | 11,043 | 594 | 1,980 | 4,356 |
|       | Faces    | 21,955 | 198 | 2,356 | 5,940 |

Figure 12:
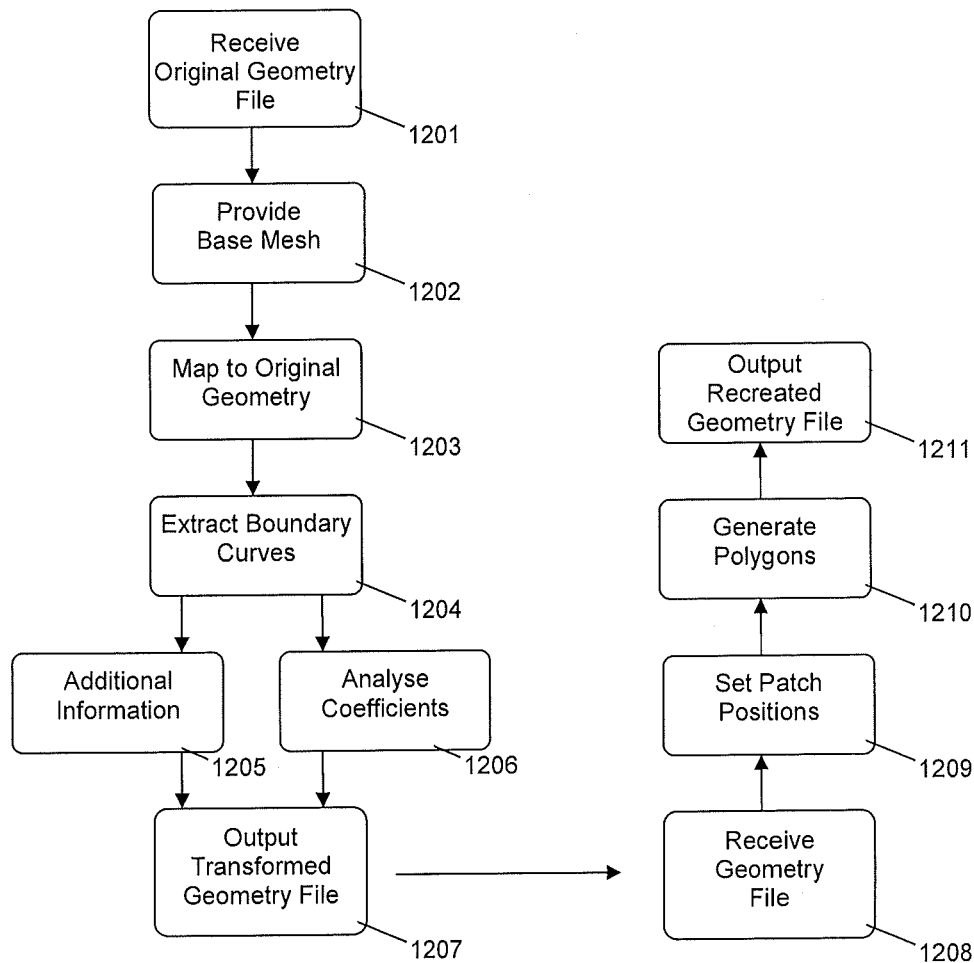
FIG. 12 is a schematic flowchart showing an example method of geometry conversion and an example method of geometry regeneration.

FIG. 12 is a schematic flowchart showing both an example method of geometry conversion and an example method of geometry regeneration.

Consistent with the process as described above and looking again particularly at FIG. 5, in this example of the method of geometry conversion, the step 1201 suitably comprises receiving geometry data relating to an original object 510. The received geometry data may comprise a polygon mesh.

Step 1202 comprises analysing the geometry data relating to the original object 510 to provide a base mesh 520. The base mesh is suitably a low resolution version of the received polygon mesh. The base mesh 520 may comprise a plurality of patches 521 each based on a polygon derived from the base mesh. The step 1202 suitably includes reducing the original model 510 into the low-resolution mesh configuration 520, which conveniently uses regular polygons such as triangles. However, it is possible to arrive at the base mesh 520 in other ways, such as by approximation.

Step 1203 includes mapping each of the patches 521 to the geometry data of the original object 510. This step suitably includes defining a plurality of control points 523 relative to the patch 521. The control curves may be provided along an outer edge of the patch 521. The step 1203 suitably includes mapping these control points 523 to the geometry data of the original object 510. The mapping step suitably modifies the position of the control points 523 toward the geometry data of the original object 510.

Step 1204 includes processing each of the patches 521 to provide boundary conditions 524 relating to each of the patches 521. That is, the processing step suitably includes defining at least a first boundary condition 524a. The first boundary condition 524a may be defined by a plurality of the control points 523 spaced about the outer edge of the patch 521. The step 1204 suitably further includes defining at least a second and/or one or more subsequent boundary conditions 524b-d. The boundary conditions 524a-d may be defined by a plurality of the control points 523. The second and/or subsequent boundary conditions 524b, 524c may be described by scaling the first, outer boundary condition 524a.

The step 1205 optionally includes storing additional positional information relevant to each of the patches 521. The additional positional information may include one or more position points 531 which set a position of the patch 521. The additional positional information may include one or more position points 531 which inform continuity between adjacent ones of the patches 521. These position points 531 may correspond to select ones of the mapped control points 523.

Step 1206 includes computing the coefficients 540 of a solution to a partial differential equation according to the boundary conditions 524. That is, the step 1206 may include computing the solution to the biharmonic equation for each of the triangular surface patches 521. Suitably, the coefficients 540 associated with the analytic solution of this equation are found and stored in a file. Now, each of the patches 521 can be considered as a PDE surface patch 530.

Step 1207 comprises outputting the coefficients 540 for each of the patches 521 as transformed object geometry data 350. The transformed object geometry data 350 may include the additional positional information 531. The transformed object geometry data 350 may be subsequently stored, handled, transmitted, rendered or output as needed.

Also according to the process described above, in the method of geometry regeneration, step 1208 comprises receiving geometry data 350 relating to an object to be regenerated. The received geometry data 350 in this case suitably comprises coefficients 540 relating to each of a plurality of patches 521. The patches 521 are suitable PDE surface patches 530.

Step 1209 includes setting a position of each of the patches 521. This step may include setting the position of the patch 521 with respect to volumetric coordinate system. The position of the patch 521 is suitably defined by a plurality of position points 531.

Step 1210 includes subdividing each of the patches 521 according to a subdivision scheme to generate a plurality of polygons within respect to volumetric region as defined by the respective patch 521. The subdivision scheme suitably has a plurality of levels and this step suitably includes subdividing the patch 521 to a predetermined one of the subdivision levels according to a desired resolution of the plurality of polygons.

Step 1211 includes outputting the plurality of polygons as geometry data of the recreated object 550. The object is now regenerated (i.e. recreated or even created for the first time) as a polygon mesh and can be stored, handled, transmitted, rendered or output according to any suitable polygon-based technique as will be familiar to those skilled in the art.

In summary, the automatic geometry conversion technique provides mesh simplification that has been used to obtain the boundary conditions required for calculating the PDE method. The technique starts by dividing the input mesh model into a set of boundary curve-based patches. The mesh is reduced using a mesh simplification technique until it reaches a satisfactory level of quality and number of faces. Each face is then converted to a template boundary patch comprising control points. These control points are then projected to the original mesh in order to extract the features that lie within that region. Once a boundary patch is complete, the process continues by generating three additional inner curves for that particular patch, and the four curves in total per patch are used to calculate the PDE method. Once a given model can be described as a set of curves, it can be reconstructed using PDE surfaces over a given level in real time. This offers great advantage in environments where the level of detail controls the resolution of the model determined from the distance of the user to the object. The compressed PDE data required for constructing a surface are much smaller in size compared to any optimized mesh model. Only a small set of curves, each with say 31 control points, for a hundred or so PDE surface patches, is enough to represent an original mesh model consisting of thousands vertices and faces. However because the described PDE method is an approximation technique, it is recognised that some features may get lost during the evaluation of the surface and due to various operations (mesh reduction, raytracing) that take place on the original mesh model.

Texture Processing

In one aspect, a convenient and powerful mechanism is provided which is particularly suitable for transforming and/or compressing image files, and for later regenerating the image files. In particular, the example embodiments provide a mechanism for the transformation or compression of texture data for a volumetric object.

Texture data commonly includes an image file of a suitable format. Popular examples in the art include PNG, GIF or JPEG format files. Typically, this flat (2D) image is associated with a set of normal vectors that define a surface displacement of the image over an underlying three-dimensional structure of the 3D object. These textures are usually anchored to the geometric structure using texture coordinates which define a positional relationship of the texture image over a surface of the object. Texture normals may be distributed at intervals over the area of the texture image to provide detailed localised displacements away from the standard plane of the image. These normals are usually employed when rendering a final image (e.g. using raytracing techniques) to give a highly realistic finished image with effects such as shading and highlighting.

In the related art, U.S. Pat. No. 5,956,431 to Iourcha et al. describes a system and method for fixed-rate block-based image compression with inferred pixel values. This system has been widely adopted for texture compression in a games environment and is commonly known as DXT. The DXT system is a family of lossy texture compression algorithms. In commercial implementations, the DXT system gives a maximum of 8:1 compression.

A problem arises in that the textures are typically relatively large in size. In practice, the textures may be about 80% of the total data volume for a given object, while the geometry data is only about 20% of the total data.

The example embodiments aim to alleviate the various problems caused by the large size of the textures, which include slow downloads, long delays and excessive consumption of storage media. Also, the example embodiments aim to address at least some of the problems caused by traditional attempts to compress these textures.

The example embodiments reduce the size of the textures even further and cope better with extremely low amounts of data. Textures are used for a large number of purposes besides storing image data, including additional graphical processing applications such as normal and displacement mapping. Standard image compression techniques are not suitable for these applications as they ignore the vector based nature of the data. However, the example embodiment is suitable for compressing these types of data.

The example embodiments use PDEs to encode the image into a compressed form. In one example, the texture transformation mechanism uses a number of nested PDEs to allow the information to be placed where most needed.

In the example embodiments, the image is sampled to generate suitable boundary conditions to solve a number of PDEs. The image is processed to determine where the PDEs will be located within the image. The image can be re-created from solutions of these PDEs. That is, one or more base PDEs may be provided which represent a very poor initial approximation of the image. More PDEs may be added to increase the detail and improve the approximation. Eventually an image very close to the original can be recovered. Accuracy can be traded for compression space by reducing the number of PDEs used.

The example compression mechanism is well suited to handle data traditionally stored in image maps but with a vector-based end use. This includes normal maps, height maps and displacement maps. It is possible to apply the same technique in three dimensions to create a video compression technique. Other potential variants would be to apply the technique to 3D texture data, or to create volumetric objects.

This processing of texture data using PDEs is applicable in a wide variety of specific implementations, including video games, image editing software, 3D rendering software, medical imaging, architectural visualisation, engineering software, and image compression for the Internet, amongst many others.

Figure 13:
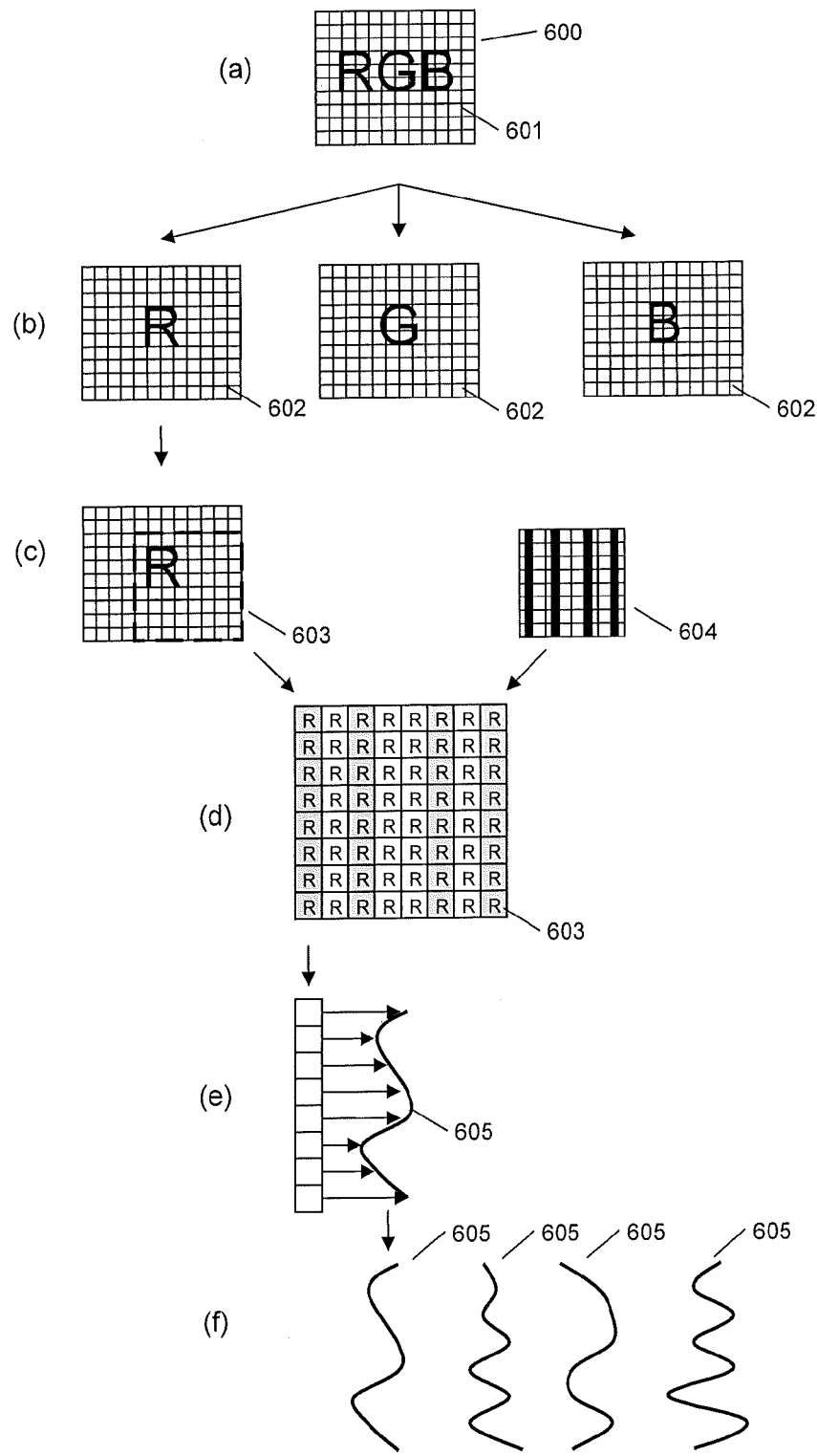
FIG. 13, including

FIG. 13 is a schematic diagram illustrating an example embodiment of image file processing using partial differential equations (PDEs).

FIG. 13a shows an example of a received image file 600, which in this case is an image file to be used as texture of a graphics object. Typically, the received image has a relatively large number of pixels in a pixel array 601. For example, image sizes may typically range from 32×32 pixels up to around 2048×2048 pixels.

The received image file data 600 can take any suitable image file format. Generally, the received data 600 comprises information relative to the pixel array 601, which is suitably divisible into a plurality of channels. Typically there are at least three channels.

For illustration, this example shows an array of pixels each containing red (R), green (G) and blue (B) colour channels. Optionally, the received RGB format data is converted instead to another format. As examples, other formats include YUV format, $YC_oC_g$ or $YC_rC_b$ format, with the steps described below then being applied to these channels. In one example embodiment, the received image data is provided in, or is converted into, in $YC_rC_b$ format, with the two chroma channels optionally being sampled at half-resolution. This format significantly reduces the amount of data in the file, but without substantially adversely affecting human perception of the resulting image.

Optionally, the received data 600 may include fourth or further channels, such as RGBA format data. In this case, the a channel is suitably used to represent height, to give a height map, or may be used to carry other information, such as transparency or specularity. As another example, normal vectors of a normal map may be represented by x, y & z channels. In other words, the image file will generally include information in pixel format relating to a plurality of channels.

As shown in FIG. 13b, the received image 600 is suitably divided into the plurality of separate channels 602, with the R, G & B channels being illustrated in this example. Each channel 602 can be considered as a two-dimensional pixel array with a single variable at each pixel position. Conveniently, many of the following steps may be performed separately and independently with respect to each of the channels, which encourages processing efficiency and parallelisation.

In FIG. 13c, the pixel array 601 of one of the channels 602 is sub-divided into a plurality of patches 603. Conveniently, the patches 603 are all of the same size and are dynamically dimensioned according to the dimensions of the original pixel array, so that the original pixel array is divided into an exact number of patches. As one option, the dimensions of the patches are user-selectable. However, any suitable subdivision scheme may be applied to divide the pixel array 601 into the plurality of patches 603. The patches 603 may have different sizes for different channels.

FIG. 13d shows one of the patches 603 in more detail. In this example the patch 603 is 8 pixels wide by 8 pixels high for illustration. As shown in FIG. 13d, four boundary selectors 604 are overlaid onto the pixel patch 603. In this example, four of the columns have been chosen as the four boundary selectors, shown shaded. However, any suitable pattern or arrangement may be applied to choose each of the boundary selectors 604. As another example, four separate rows can be chosen as the boundary selectors. As another example, concentric circles or concentric rectangles can be chosen as the boundary selectors.

FIG. 13e is an illustrative example of one of the boundary selectors 604, in this case corresponding to the left most shaded column in FIG. 13d. As shown in FIG. 13e, each boundary selector 604 has selected a series of pixels from the pixel patch each having an associated value. In this example, the length of each arrow represents the R value of that sample point. As shown in FIG. 13e, these extracted sample values thus represent points on a boundary curve. In other words, a plurality of boundary curves are extracted from the pixel patch as a set of discrete points on a representative boundary curve. Optionally, the extracted pixel data is averaged or otherwise modified to take account of values in adjacent or neighbouring pixels.

FIG. 13f shows an example set of four boundary curves 605 extracted from the four shaded columns of pixels in FIG. 13d. In practice, the pixel values within each channel may be represented by a 32-bit floating point number between 0 and 1. Thus, the boundary curves 605 in practice will tend to have much more complex shapes than the simplified versions illustrated here.

As noted above, previously the PDE surface patch has been used to represent part of the surface of an object (i.e. part of the object's geometry in XYZ physical space). Now, in the example embodiments, the same PDE is used instead to represent information within an image or texture, such as one of the R, G or B colour channels in the colour space. Conveniently, this new representation can be termed a "PDE texture patch". For completeness, note that the terms $\underline{a}_{00}$, $\underline{a}_{01}$, $\underline{a}_{02}$, $\underline{a}_{03}$, $\underline{a}_{n1}$, $\underline{a}_{n2}$, $\underline{a}_{n3}$, $\underline{a}_{n4}$, $\underline{b}_{n1}$, $\underline{b}_{n2}$, $\underline{b}_{n3}$ and $\underline{b}_{n4}$ are now scalar constants, because the PDE is applied to a separate one of the colour channels in the example embodiments.

It will be appreciated that the boundary curves 605 extracted from the pixel patch 603 can be analysed to provide the plurality of Fourier coefficients, by using these boundary curves as boundary conditions in the analytic solution of the PDE in Equations (3)-(7) as described above. Conveniently, these Fourier coefficients are grouped into a plurality of modes. In this example, each mode comprises four Cosine coefficients and four Sine coefficients, as illustrated in the table below:

| mode | Cos coefficients | Sin coefficients |
|---|---|---|
| 0 | $A_1$-$A_4$ | $B_1$-$B_4$ |
| 1 | $A_5$-$A_8$ | $B_5$-$B_8$ |
| 2 | $A_9$-$A_{12}$ | $B_9$-$B_{12}$ |
| 3 | $A_{13}$-$A_{16}$ | $B_{13}$-$B_{16}$ |
| 4 | $A_{17}$-$A_{20}$ | $B_{17}$-$B_{20}$ |
| ... | ... | ... |
| N | $A_{4N+1}$-$A_{4(N+1)}$ | $B_{4N+1}$-$B_{4(N+1)}$ |

It has been found that creating greater than about 10 or about 12 modes introduces distortion which tends to degrade the recreated image. Thus, it is preferred to use up to about 7 or 8 modes in the example embodiments.

At this point, each of the coefficients is conveniently held as a 32-bit floating point number between 0 and 1. However, a considerable data saving can be achieved by quantising (e.g. truncating or rounding) the 32-bit coefficients each to 12-bits, without introducing any significant losses.

The original image file 600, such as shown in FIG. 13a above, has now been significantly compressed. Each pixel comprised 32-bit values for each of three RGB channels (i.e. 32-bits per pixel per channel) in the original image file. Thus, one pixel patch 603 as shown in FIG. 13d of, say, 8×8=64 pixels, requires 64×32=2 Kb for all channels. By contrast, the coefficients, at 12-bits each, require 8×12=96-bits per mode per channel per patch. Assuming that eight modes are used, the data for this pixel patch 603 has been compressed to only 96×8=768-bits per channel.

In practical embodiments, further compression efficiencies may be achieved by considering the 12-bit coefficients across the plurality of patches and employing other data compression techniques as will be familiar in the art. For example, the coefficients are compressed by run length encoding. That is, the process suitably further comprises the step of encoding the coefficients. The encoding step suitably includes encoding together the plurality of coefficients produced in each of a plurality of the patches and/or for each of a plurality of the channels. As another example, a plurality of patches may be encoded together to remove redundancy, such as by indicating in a header file or marker that two patches have the same coefficients. Thus, only one set of coefficients need be provided, to be applied to both of the patches.

Figure 14:
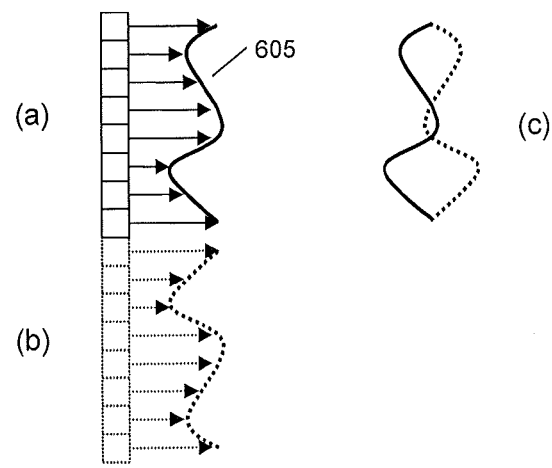
FIG. 14, including

FIG. 14 is a schematic diagram illustrating a further refinement of the image file processing function. Suitably, the extracted boundary conditions 604 are manipulated in order to create a closed form of the boundary curve 605.

In FIG. 14a, the leftmost boundary curve 605 has been reproduced from FIG. 13e. This column of pixel values is mirrored as shown in FIG. 14b. At first sight, this would appear to double the volume of data. However, as shown in FIG. 14c, the mirroring has closed the curve. As a result, the Sine terms in Equation (3) become zero and can be ignored. Thus, only the Cosine coefficients are now needed, giving a considerable data saving. The 8-mode coefficients for the same example 8×8 patch 603 now require only 4×12×8=384 bits per channel.

Figure 15:
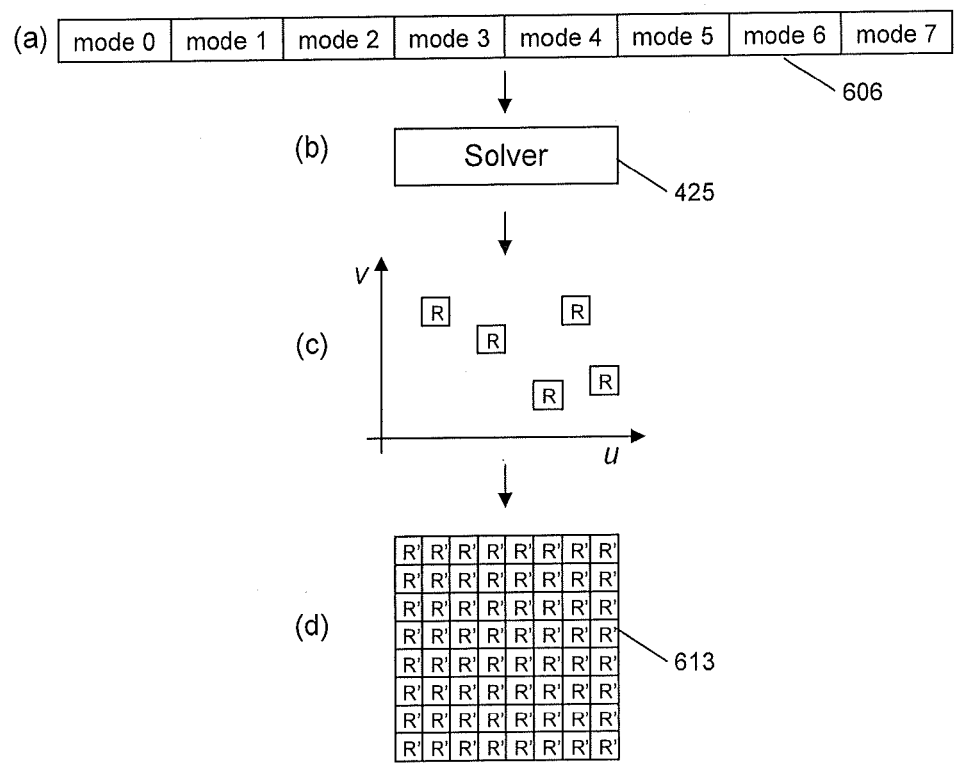
FIG. 15 illustrates an example process of recreating an original image file.

FIG. 15 illustrates a general process of recreating or regenerating a texture or image file 610 from a received set of coefficients 606.

FIG. 15a shows that, in this example, eight modes of the coefficients 606 are provided, i.e. mode 0-mode 7. These coefficients 606 are provided to a solver unit 425, as shown in FIG. 15b. The solver unit 425 is suitably provided as part of the texture transformation unit 420 in the object transformation unit 400 or the dynamic transformation unit 405, as described above. The solver unit 425 solves the PDE with respect to the applied boundary conditions 604 for any desired values of the parameters u and v. Thus, in the example embodiments, the solver 425 is able to recreate the file at any desired resolution, which may be enhanced above the resolution of the original file.

In this illustrative example, the solver unit 425 outputs a recreated value of the red channel R at any desired position over the u, v field. Conveniently, the solver 425 outputs recreated value of R at each of a plurality of pixel positions to output a recreated pixel patch 613 as shown in FIG. 15d. The recreated pixel patch 613 may, for example, then be output to a display, or saved in any suitable hardware storage device.

Figure 16:
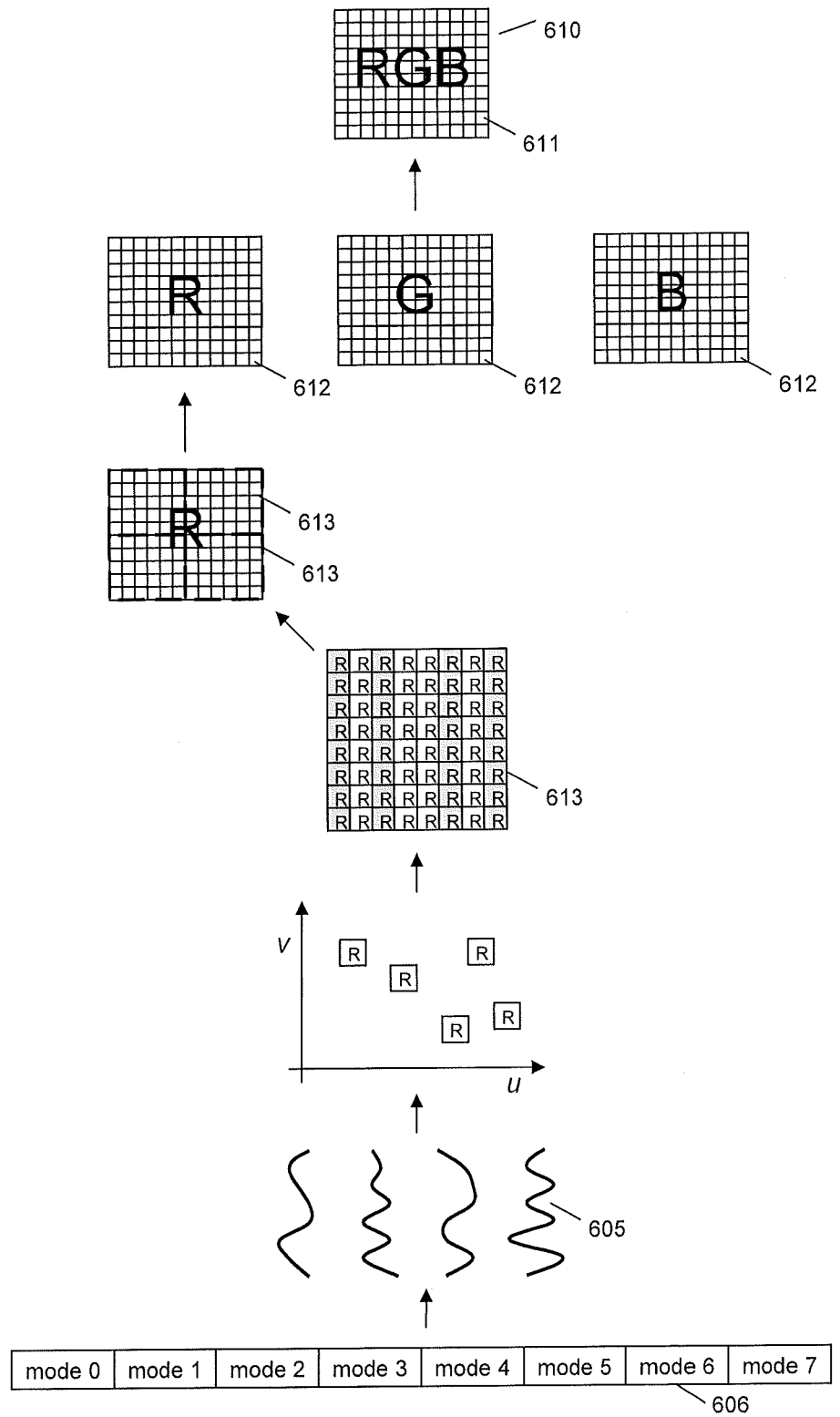
FIG. 16 further illustrates an example process of recreating an original image file.

FIG. 16 further illustrates the process of recreating a texture image file 610 from the coefficients 606 of the boundary curves 605.

In the example embodiments, the client device 200 includes the solver unit 425. In use, the solver unit 425 solves the same PDE using a received set of the coefficients 606. The client-side solver unit 425 solves the PDE, as was illustrated in FIG. 15, to output the recreated pixel patch 613.

In the reverse of the process described above, a plurality of the pixel patches 613 are reassembled to recreate one of the colour channels 602, and these recreated colour channels 612 are suitably combined to provide a recreated pixel array 611 of a full recreated data file 610. The recreated file 610 is stored or output in any suitable form.

Suitably, the recreated data file 610 can now be supplied to standard rendering components in the graphics processor 220 of the client device 200 to be rendered and displayed on any suitable display device 210.

Figure 17:
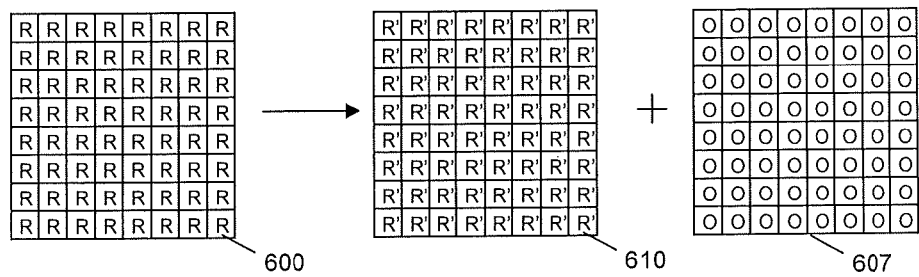
FIG. 17 further illustrates the example image processing mechanism.

FIG. 17 illustrates a further refinement in the texture processing mechanism. Here, a set of offsets 607 are created to supplement the coefficients 606. In particular, FIG. 17 is a schematic view illustrating a relationship between one original pixel patch 603 and the corresponding recreated pixel patch 613 as described above. Generally, small discrepancies may arise between the original data 600 and the recreated data 610. In some cases, these discrepancies are not readily noticeable and can be ignored. That is, the recreated data file 610 may provide an acceptable approximation of the original data 600. However, in one example embodiment, variations between the two data sets are corrected by providing a set of offsets 607 representing a difference between the original data 600 and the recreated data 610. Conveniently, the offsets 607 are stored and sent along with the coefficients 606, for some or all of the channels, thus allowing a completely lossless recreation of the original data 600. This lossless format is particularly beneficial for certain types of image data, such as a normal map.

Figure 18:
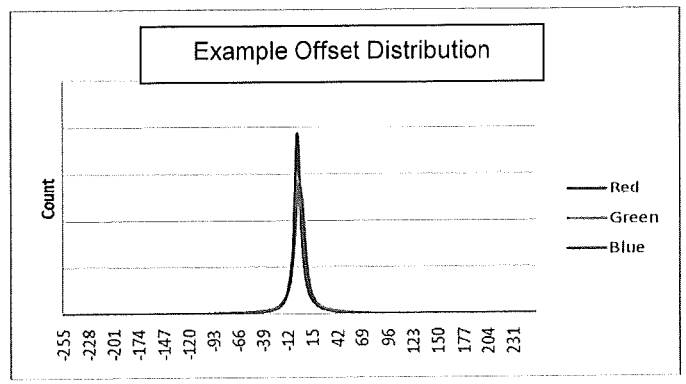
FIG. 18 further illustrates the example image processing mechanism.

FIG. 18 illustrates a further refinement in the example texture processing mechanism. In particular, FIG. 18 is a graph showing a distribution of offset values for red, green and blue channels for a well-known example image "Lena". Here, the offsets are given in the range +255 to −255, but most of the offset values are relatively small. Hence, the example texture processing mechanism produces a reasonably close approximation of the original image. However, a further step of limiting a range of the offsets to a predetermined threshold less than the maximum range, for example, +/−64, allows the offset data 607 to be compressed with greater efficiency.

Figure 19:
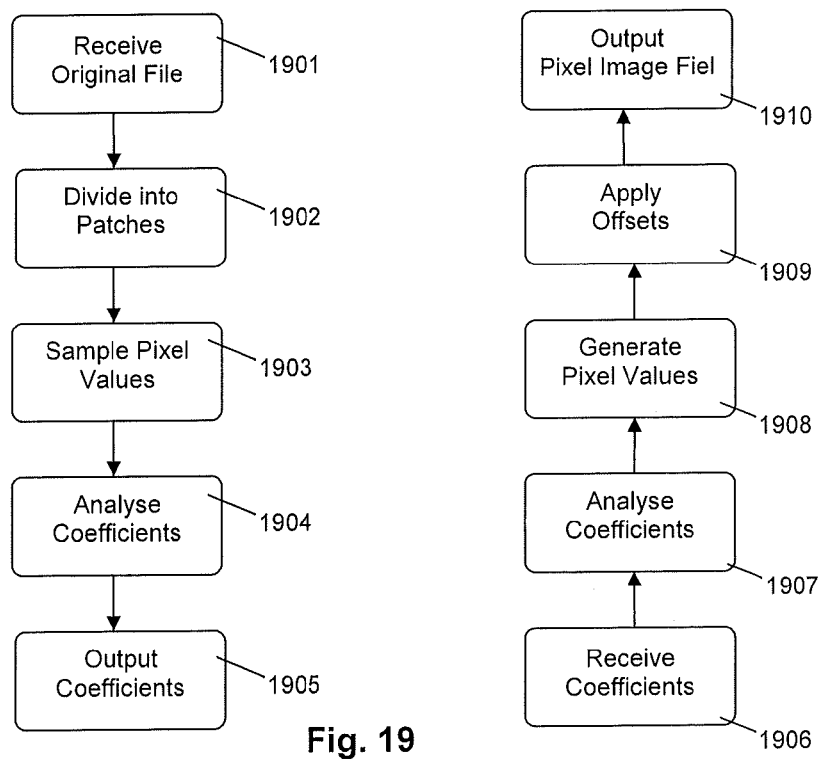
FIG. 19 is a schematic flowchart showing an example method of image file transformation and an example method of image file regeneration.

FIG. 19 is a schematic flowchart illustrating an example method of image file processing. This method is based on the example embodiments already discussed above in detail. Conveniently, FIG. 19 shows both an example image file transformation method and an example image file regeneration method.

Step 1901 comprises receiving an image file which includes pixels. That is, the image file is received in any suitable pixel-based format. The information in this pixel format suitably relates to a plurality of channels.

Step 1902 comprises dividing the pixels into a plurality of patches. This dividing step suitably comprises forming the pixel patches on a pixel array separately for each of the channels.

Step 1903 comprises sampling the pixels to generate boundary conditions relating to each of the patches. This step may include overlying a plurality of boundary selectors onto the pixels, sampling the pixels to provide a plurality of sample points, and forming the boundary conditions as boundary curves based on the sample points. Also, this step may include manipulating the sample points to create the boundary conditions as closed form curves.

Step 1904 comprises deriving coefficients of a solution to a partial differential equation according to the boundary conditions. This step may include quantising the coefficients. This step may include encoding the coefficients, such as with run length encoding. The encoding may be performed locally within one patch and/or globally across a plurality of the patches.

Step 1905 comprises outputting the coefficients for each of the patches as a transformed image file.

The regeneration method allows the pixel-based format of the image file to be recreated, or created for the first time, from the coefficients.

The step 1906 comprises receiving the data relating to an image file to be regenerated, wherein the data comprises the coefficients relating to each of a plurality of patches. In this case, the patches are the PDE texture patches or PDE image patches as described herein.

The steps 1907 and 1908 comprise generating a plurality of pixel values by using the coefficients as a solution to a partial differential equation for each of the patches. Here the step 1907 may include analysing the coefficients ready to be used as a solution to a partial differential equation for each of the patches, while the step 1908 specifically generates the pixel values by applying appropriate parametric inputs to the partial differential equation, i.e. the inputs u and v, to generate the pixel values at the respective pixel positions across a pixel array. The pixel values are suitably generated separately for each of the channels.

Step 1909 optionally includes applying offsets to the generated pixel values. These offsets reduce (or even eliminate) a variation between the generated pixel values and original or desired pixel values. The offsets in particular allow for lossless encoding.

Step 1910 comprises outputting the plurality of pixel values as a regenerated image file in a pixel-based format. The image file may now be stored, handled, transmitted, rendered or output according to any suitable pixel-based technique as will be familiar to those skilled in the art. Where the image file relates to the texture of an object, the texture can now be applied to the object using familiar pixel-based techniques.

Figure 20:
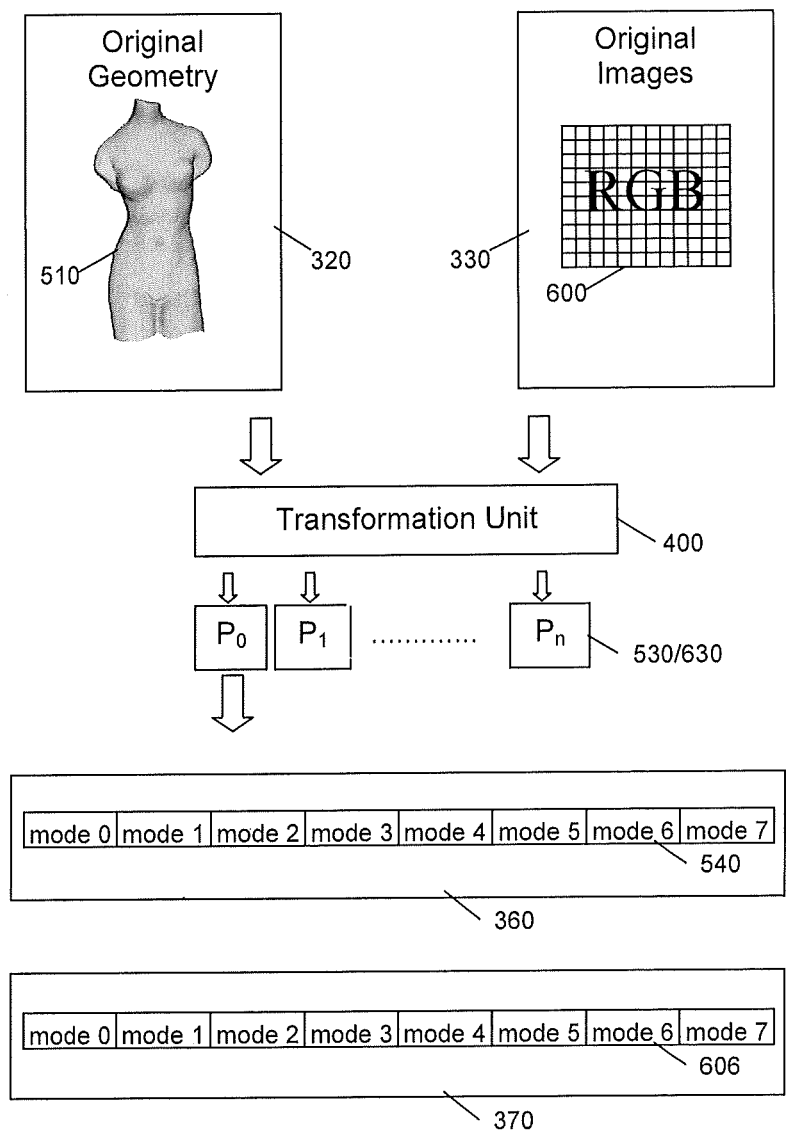
FIG. 20 is a schematic diagram further illustrating the example object transformation mechanism.

As a convenient summary, FIG. 20 is a schematic diagram showing the original object data 310 and the transformed object data 350 as discussed above. In the example embodiments, the original object data 310 includes the original object geometry data 320 and/or the object image data 330 as mentioned above. The object transformation unit 400 transforms the object geometry data 320, which is suitably in a polygon mesh format, i.e. an original polygon mesh 510, into the compressed object geometry data 360 comprising coefficients 540 of a solution to a partial differential equation. These geometry coefficients 540 relate to a plurality of patches 530, which are suitably PDE surface patches. Meanwhile, the object transformation unit 400 transforms the object image data 330, which may comprise images 600 in a pixel-based format, to produce the compressed object image data 370 comprising coefficients 606 of a solution to a partial differential equation. These image coefficients 606 relate to a plurality of PDE texture patches or PDE image patches 630. As shown in FIG. 20, the coefficients (540, 606) include a mode zero and one or more subsequent modes. In this case there are eight modes in total for the coefficients relating to each patch.

Security/Anti-Piracy

The example embodiments address significant issues which arise in relation to the security of game data and avoiding unauthorised distribution of a game (piracy). Data security is an important feature in the field of multimedia distribution generally and many approaches to digital rights management have already been developed.

Figure 21:
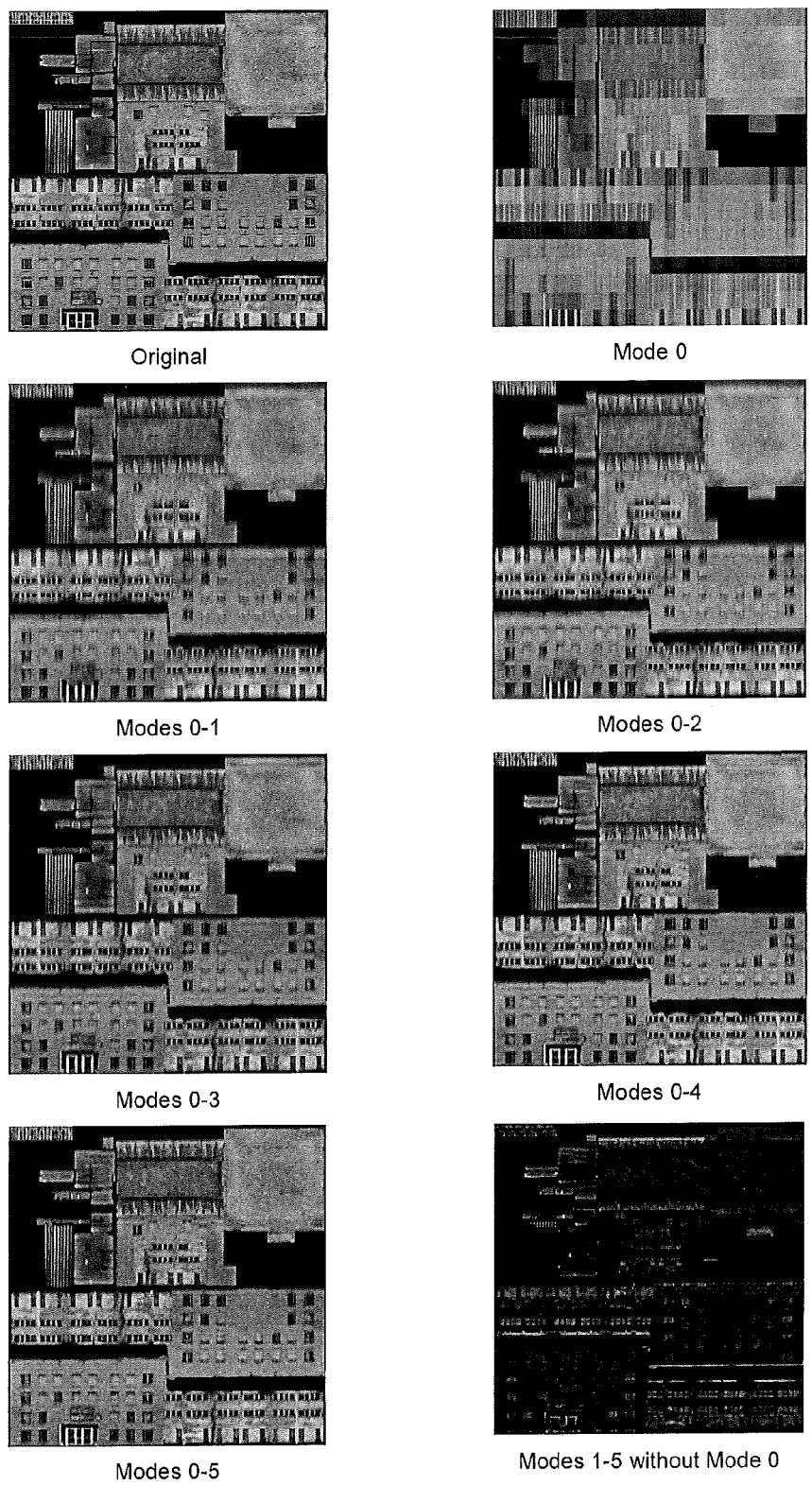
FIG. 21 is a sequence of images to illustrate a security aspect of the example embodiments.

FIG. 21 is a sequence of images to illustrate a security aspect of the example embodiments. In this example, an original test image is shown in the upper left, while the other images are each regenerated images derived from the coefficients as described above. These images demonstrate that, with progressively more modes available, the regenerated image becomes progressively more detailed and a better approximation of the original image is achieved. The regenerated image based on the combination of coefficients for mode zero through to mode five is a relatively close approximation of the original image.

It has been found that, by selectively removing at least the zero mode, the regenerated image becomes significantly impaired. The last image, bottom right, shows the regenerated image based on the coefficients of mode 1 though mode 5, but without the coefficients for mode zero. Similarly, removing mode zero of the object data significantly impairs the object regeneration mechanism. Thus removing the zero mode for at least one of the object geometry data 3670 and/or the object image data 370 is an effective measure to improve security and to combat piracy.

Figure 22:
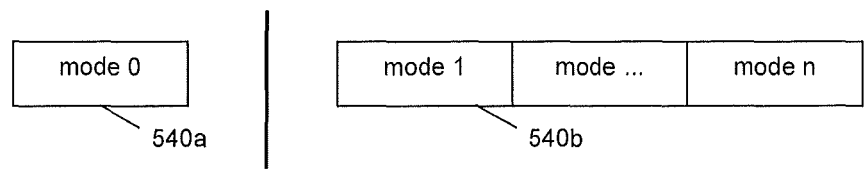
FIG. 22 is a schematic diagram further illustrating a security aspect of the example embodiments.

FIG. 22 shows an example embodiment in which the coefficients 540a for at least the zero mode (mode 0) are separated from the coefficients 540b of the other, subsequent modes (mode 1 . . . n). The coefficients 540a of the zero mode are, in themselves, a relatively small amount of data, but are critical to the correct functioning of the regeneration mechanism.

Figure 23:
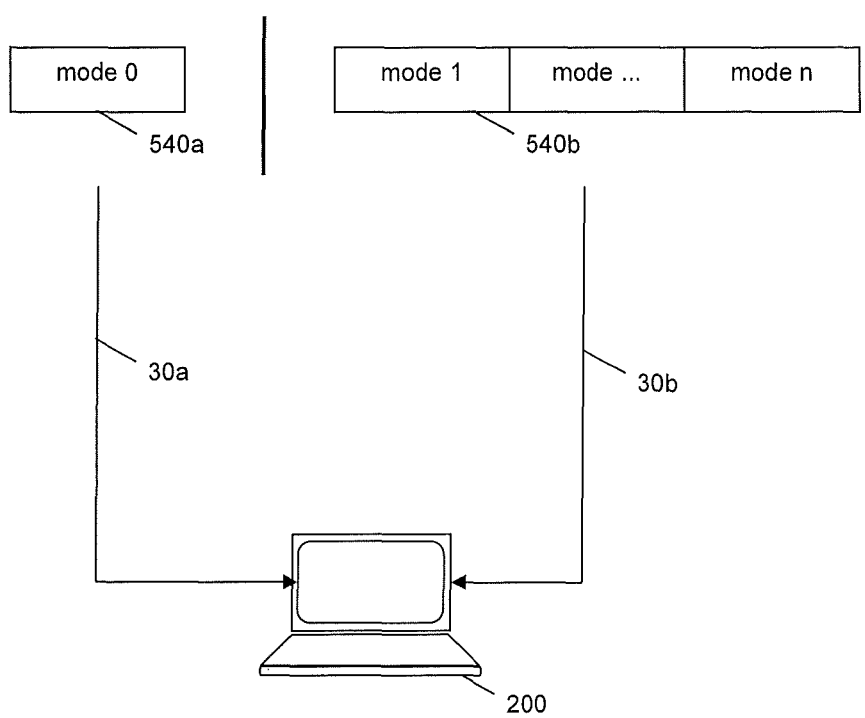
FIG. 23 is a schematic diagram further illustrating an example secure multimedia content distribution system.

FIG. 23 shows an example secure multimedia content distribution system. In this example, removing the mode zero data 540a enables significant improvements in the secure distribution of a game. For example, significant quantities of object data relating to the lesser, subsequent modes 540b may be distributed in a relatively insecure distribution channel 30b. Meanwhile, the mode zero coefficients 540a for this object data are distributed to the client device 200 only through a secure distribution channel 540a. For example, the secure distribution channel 540a uses strong encryption and requires secure authentication by the user of the client device 200. Many specific secure and insecure distribution channels will be familiar to those skilled in the art, and the details of each channel will depend on the specific implementation. The lesser modes 540b in the main channel 30b may even be copied and distributed in an unauthorised way, but are relatively useless unless and until the corresponding mode zero data 540a is obtained and reunited therewith. As one of the many advantages, this mechanism significantly reduces the quantity of data to be distributed through the secure channel 30a. Thus, new users can be attracted by providing mode zero data 540a for a sample or trial set of game data, while maintaining strong security for other game data to be released to the user later, such as after a payment has been made.

The client device 200 is suitably arranged to store at least the mode zero in a secure temporary cache 245. This cache is suitably cleared, e.g. under instructions from the server 100, at the end of a gameplay session. Meanwhile, other data, such as the other modes, may be maintained in a longer-term cache or library to be used again in a subsequent session, thus avoiding the need for duplicate downloads while maintaining security.

Bandwidth Management

Figure 24:
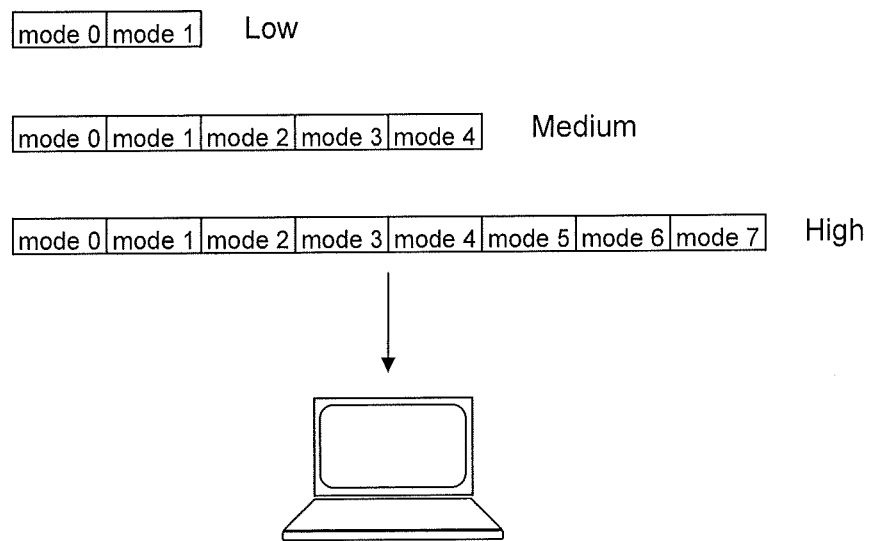
FIG. 24 shows a further aspect of the example multimedia content distribution system for managing bandwidth.

FIG. 24 shows a further aspect of the example multimedia content distribution system for managing bandwidth. In this example embodiment, the data management unit 120 of the server 200 is arranged to control distribution of the compressed object data 350 to the client device 200 with improved bandwidth management. In this case, it is desired to maximise and control the outgoing bandwidth available at the server 100. Also, it is desired to adapt to the available incoming bandwidth at the client devices 200.

In the example embodiments, the server 100 provides the coefficients 540 in the various modes according to a connection status or connection level with the client device 200. Conversely, in some example embodiments, the client device 200 is arranged to request the coefficients from the server 100 at one of a plurality of predetermined levels of detail.

Thus, for a low-bandwidth communication with a particular client device 200a, the server 200 sends, or otherwise makes available, suitably only the higher-order (most important) modes 540, which suitably includes at least the mode zero data 540. This first group of one or more modes allows the client device 200 to regenerate the objects at a first level of resolution, which may still be acceptable for playing the game. For a medium-bandwidth connection, the modes 540 are made available to the client device 200 at a second level of detail, with this second level containing more modes than the first level. At the highest connection level, a maximum number of modes are made available to the client device 200, allowing the client device to achieve a highest resolution in the regenerated objects. This principle can also be extended in also sending the additional or ancillary data relating to the objects at different levels, such as by sending the image offsets 607 at different levels of detail.

The sever 100 is now better able to manage the available outgoing bandwidth to service multiple users simultaneously and cope with varying levels of demand. Further the server 100 is able to satisfy a user at each client device 200 to provide acceptable levels of gameplay appropriate to the incoming bandwidth or connection currently available for that client device 200. In many cases, a (perhaps temporary) drop in resolution is to be preferred over a complete loss of gameplay while waiting for high-resolution objects to arrive. Thus, the client device 200 is better able to continue gameplay without having to pause. Also, the system is able to service a wide constituency of client devices 200 from the same source data, i.e. without needing to host multiple versions of the game data.

As a further refinement, objects within the environment may be assigned different priorities. For example, an object with a relatively high priority (such as a player character or closely adjacent scenery) is supplied to the client device 200 with relatively many modes, similar to the high connection level, and is thus capable of being regenerated at a high resolution, while an object with a relatively low priority (e.g. a distant vehicle or building) is delivered to the client device 200 with relatively few modes, i.e. at a low level, to be regenerated at relatively low resolution.

Multiple Data Sources

Figure 25:
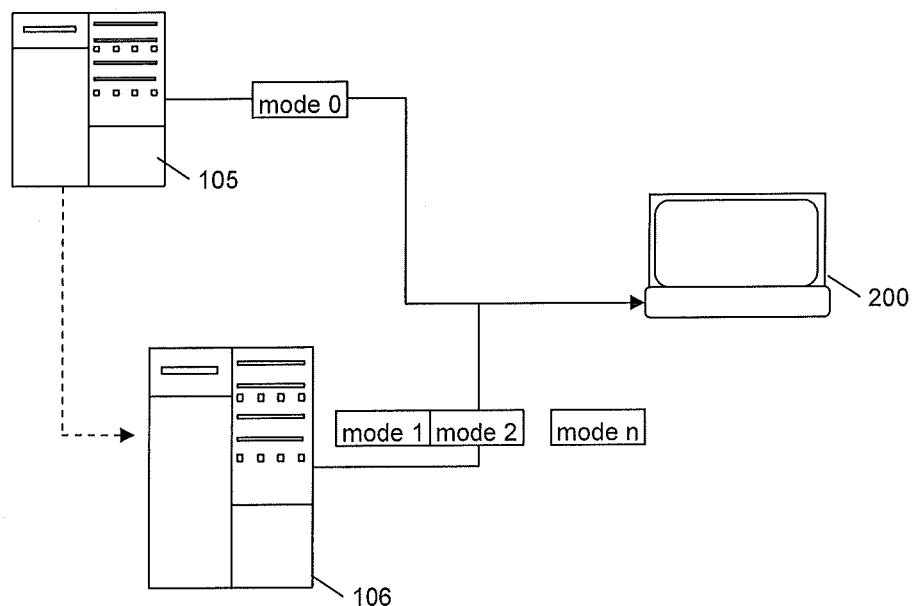
FIG. 25 shows a further aspect of the example multimedia content distribution system using multiple data sources.

FIG. 25 shows a further aspect of the example multimedia content distribution system using multiple data sources. In this example, the server 100 is provided including a gameplay server 105 and a content delivery server 106. Here, the gameplay server 105 suitably includes the environment engine 150 as described above to control a virtual environment and thus act as a master. The gameplay server 105 suitably issues control instructions (illustrated by the dotted line) to the content server 106. Meanwhile, the content server 106 is arranged to supply portions of game data, including particularly the compressed object data 350, to the client device 200, i.e. in response to the control instructions from the gameplay server 105. The content delivery server 106 conveniently is located relatively close to groups of client devices 200 and thus can deliver content relatively quickly. As one example, the content delivery server 106 is provided by a $3^{rd}$ party content delivery agent as will be familiar to those skilled in the art. In another example, the content delivery server 106 is provided by peer-to-peer sharing. In the example system, the content delivery server 106 is arranged to send at least some of the modes of the coefficients 540 to the client device 200 securely and/or with bandwidth management as described above. As noted above, it is possible to freely distribute some of the modes while keeping other modes, suitably at least mode zero, to be distributed separately. Thus, the subsequent mode are distributed through a less secure channel such as from the content delivery server 106, while the most significant mode, i.e. mode zero, is supplied direct from the gameplay server 105. Thus, the gameplay server 105 suitably maintains strong control over at least the mode zero data, while the content delivery server 106 additionally supplies one or more subsequent modes for those same objects with fewer restrictions.

INDUSTRIAL APPLICATION

The invention as described herein may be industrially applied in a number of fields, including particularly the field of delivering multimedia data (particularly graphical objects) across a network from a server device to client device.

The example embodiments have many advantages and address one or more problems of the art as described above. In particular, the example embodiments address the problem of serving many separate client devices simultaneously with limited resources for the server and/or for bandwidth, which are particularly relevant with intensive gaming environments. The example embodiments address piracy and security issues. The example embodiments also allow dynamic resolution of objects, in terms of their geometry and/or textures, within a virtual environment.

At least some of the example embodiments may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks.

Elements of the example embodiments may be configured to reside on an addressable storage medium and be configured to execute on one or more processors. That is, some of the example embodiments may be implemented in the form of a computer-readable storage medium having recorded thereon instructions that are, in use, executed by a computer system. The medium may take any suitable form but examples include solid-state memory devices (ROM, RAM, EPROM, EEPROM, etc.), optical discs (e.g. Compact Discs, DVDs, Blu-Ray discs and others), magnetic discs, magnetic tapes and magneto-optic storage devices.

In some cases the medium is distributed over a plurality of separate computing devices that are coupled by a suitable communications network, such as a wired network or wireless network. Thus, functional elements of the invention may in some embodiments include, by way of example, components such as software components, object-oriented software components, class components and task components, processes, functions, attributes, procedures, subroutines, segments of program code, drivers, firmware, microcode, circuitry, data, databases, data structures, tables, arrays, and variables.

Further, although the example embodiments have been described with reference to the components, modules and units discussed herein, such functional elements may be combined into fewer elements or separated into additional elements.

Although a few preferred embodiments have been shown and described, it will be appreciated by those skilled in the art that various changes and modifications might be made without departing from the scope of the invention, as defined in the appended claims.

The invention claimed is:

1. A computer-implemented method of transforming an image file by an image file transformation apparatus, the method comprising:
   providing an image file in a pixel-based format having a plurality of pixels;
   dividing the pixels into a plurality of patches;
   for each of the plurality of patches, sampling the pixels within a current patch to generate a plurality of boundary curves as boundary conditions for a partial differential equation, wherein the sampling comprises overlying a plurality of boundary selectors onto the plurality of pixels, sampling the plurality of pixels according to the plurality of boundary selectors to provide a plurality of sample points, and forming the boundary conditions as the boundary curves based on the sample points;
   deriving Fourier coefficients of a solution to the partial differential equation according to the boundary conditions; and
   outputting the Fourier coefficients for each of the plurality of patches as a transformed image file.

2. The method of claim 1, wherein the pixels of the image file relate to a plurality of channels, and the dividing the pixels into a plurality of patches comprises forming the plurality of patches on a pixel array separately for each of the channels.

3. The method of claim 1, further comprising:
   manipulating the sample points to create the boundary conditions as closed form curves.

4. The method of claim 1, further comprising:
   quantising the Fourier coefficients.

5. The method of claim 1, further comprising:
   encoding the Fourier coefficients.

6. The method of claim 1, further comprising:
   providing a plurality of offsets between the image file and a regenerated version of the image file in the pixel-based format produced from the Fourier coefficients.

7. The method of claim 1, wherein the image file comprises vector-based image data.

8. The method of claim 7, wherein the vector-based data includes normal maps, height maps and/or displacement maps.

9. The method of claim 7, wherein the image file comprises one or more colour channels and one or more channels of the vector-based data separate from the one or more colour channels.

10. The method of claim 1, wherein the image file is a texture file of a graphics object.

11. A computer-implemented method of generating a pixel-based image file, comprising:
    receiving data relating to an image file to be generated, wherein the data comprises Fourier coefficients relating to boundary conditions of each of a plurality of patches;
    generating a plurality of pixel values by using the Fourier coefficients as a solution to a partial differential equation for each of the patches; and
    outputting the plurality of pixel values as a generated image file in a pixel-based format;
    wherein the Fourier coefficients are generated by the steps of:
    providing the image file in a pixel-based format having the plurality of pixels;
    dividing the pixels into the plurality of patches;
    sampling the pixels to generate the boundary conditions relating to each of the patches, the sampling step comprising overlying a plurality of boundary selectors onto the plurality of pixels, sampling the plurality of pixels according to the plurality of boundary selectors to provide a plurality of sample points, and forming the boundary conditions as boundary curves based on the sample points;
    deriving Fourier coefficients of the solution to the partial differential equation according to the boundary conditions; and
    outputting the Fourier coefficients for each of the plurality of patches as a transformed image file.

12. The method of claim 11, wherein generating the plurality of pixel values comprises:
    analysing the Fourier coefficients ready to be used as a parametric inputs as a solution to a partial differential equation for each of the patches, and
    generating the pixel values by applying the parametric inputs to the partial differential equation to generate the pixel values at respective pixel positions across a pixel array.

13. The method of claim 11, wherein the patches relate to a plurality of channels, and the pixel values are generated for each of the channels from the patches.

14. The method of claim 11, wherein the generating step comprises generating the pixel values separately for each of the channels from the Fourier coefficients corresponding to each channel, respectively.

15. The method of claim 11, further comprising:
applying offsets to the generated pixel values, wherein the offsets define a variation between the generated pixel values and desired pixel values.

16. The method of claim 11, wherein the outputting step comprises outputting the generated image file in a pixel-based format to be stored, handled, transmitted, rendered or output according to a pixel-based technique.

17. A tangible, non-transient computer readable medium having instructions recorded thereon which, when executed by a computer device, perform the operations of:
receiving data relating to an image file to be generated, wherein the data comprises Fourier coefficients relating to boundary conditions of each of a plurality of patches;
generating a plurality of pixel values by using the Fourier coefficients as a solution to a partial differential equation for each of the patches; and
outputting the plurality of pixel values as a generated image file in a pixel-based format;
wherein the Fourier coefficients are generated by the steps of:
providing the image file in a pixel-based format having the plurality of pixels;
dividing the pixels into the plurality of patches;
sampling the pixels to generate boundary conditions relating to each of the plurality of patches, the sampling step comprising overlying a plurality of boundary selectors onto the plurality of pixels, sampling the plurality of pixels according to the plurality of boundary selectors to provide a plurality of sample points, and forming the boundary conditions as boundary curves based on the sample points;
deriving Fourier coefficients of the solution to the partial differential equation according to the boundary conditions; and
outputting the Fourier coefficients for each of the plurality of patches as a transformed image file.

* * * * *